United States Patent [19]

Amemiya et al.

[11] Patent Number: 5,248,567
[45] Date of Patent: Sep. 28, 1993

[54] POWER GENERATION PLANT INCLUDING FUEL CELL

[75] Inventors: Takashi Amemiya, Kawasaki; Tetsuya Funatsu, Urayasu; Motohiro Takahashi, Kunitachi; Masahiro Akiyoshi, Kawasaki; Yuji Nagata, Kunitachi; Satoshi Suzuki, Fuchu, all of Japan

[73] Assignee: Kabushiki Kaisha Toshiba, Kawasaki, Japan

[21] Appl. No.: 996,084

[22] Filed: Dec. 23, 1992

[30] Foreign Application Priority Data

Dec. 24, 1991 [JP] Japan .................. 3-341207
Jan. 27, 1992 [JP] Japan .................. 4-12357

[51] Int. Cl.$^5$ ............................... H01M 8/06
[52] U.S. Cl. ........................... 429/20; 429/17; 429/34
[58] Field of Search ............... 429/19, 20, 26, 17, 429/13, 34

[56] References Cited

U.S. PATENT DOCUMENTS 4,532,192  7/1985  Baker et al. .................. 429/19
4,537,839  8/1985  Cameron ..................... 429/20
4,686,157  8/1987  Miyake et al. ................ 429/19

FOREIGN PATENT DOCUMENTS 0374368  6/1990  European Pat. Off. .
63-34861  2/1988  Japan .
2-226664  9/1990  Japan .

Primary Examiner—Anthony Skapars
Attorney, Agent, or Firm—Foley & Lardner

[57] ABSTRACT

A fuel cell power plant comprised of a fuel cell main unit to which a fuel is supplied, a containment vessel for housing the fuel cell main unit; a purge gas supply pipe for introducing a purge gas which excludes combustion elements in the containment vessel; and a combustion element removal apparatus which is provided with the purge gas supply pipe and which effectively removes combustion elements in the purge gas before the purge gas is introduced in the containment vessel. The fuel call power plant may include a fuel reformer having at least a reforming space, and may use a reformed fuel gas or a used fuel gas as the purge gas from which the combustion elements are removed. The fuel reformer may include a burner for a reforming reaction, and in this case, the power plant may use a burner exhaust gas as the purge gas from which the combustion elements are removed. The combustion elements mainly include oxygen and reactive carbon which are removed from the purge gas before being supplied to the containment vessel.

26 Claims, 21 Drawing Sheets

POWER GENERATION PLANT INCLUDING FUEL CELL

BACKGROUND OF THE INVENTION

The present invention relates to a power generation plant including fuel cell, and more particularly, to a power generation plant in which a purge gas is supplied to a containment vessel which houses a fuel cell main unit.

In general, fuel cell power plants are power generation plants which directly and electrochemically convert the chemical energy of a fuel into electrical energy without conversion by combustion into thermal energy, and have attracted attention in recent years because of their high energy conversion efficiency. Hydrogen, methane, methanol, hydrazine or other hydrocarbon chemicals, and the like are used as the fuel, and oxygen and air is used as an oxidizing agent and as a combustion agent. The operating temperature varies from room temperature to a high temperature of 500°-1000° C. and the total plant energy conversion efficiency for electricity and heat supply is 60-80%. In this specification, there will be many cases where the description will use the example of a fuel cell which uses hydrogen rich gas as the fuel and air as the oxidizing agent but fuel cells are not limited to hydrogen fuel cells.

As shown in a first example of FIG. 1, a conventional fuel cell power plant can take a required power from between cathode electrodes not shown in the figure, and anode electrodes, and which are provided inside a fuel cell main unit 1.

Connected to the fuel cell main unit 1 are an oxidation agent supply pipe 2a and a fuel supply pipe 2b in a configuration wherein an oxidation agent and a fuel are each supplied to the fuel cell main unit 1.

Furthermore, a used oxidation-agent discharge pipe 3a and a used fuel discharge pipe 3b are also connected to the fuel cell main unit 1 so that the used oxidation-agent and the used fuel can be discharged to outside of the system after the chemical reaction between hydrogen and oxygen has taken place.

The oxidation agent which is supplied to the fuel cell main unit 1 via the oxidation agent supply pipe 2a is generally oxygen which is included in the air.

In addition, a fuel reformer 4 is connected to the fuel supply pipe 2b and this fuel reformer 4 reforms the methane gas or other hydrocarbon fuels and generates hydrogen rich gas and then supplies this hydrogen rich gas as the fuel to the fuel cell main unit 1 via the fuel supply pipe 2b.

The fuel reformer 4 is provided with a reforming space 5 where there is reformed the methane gas or the like which is supplied via a reformed fuel supply pipe 7a and in doing so generates hydrogen rich gas, and a burner 6 for supplying heat to the reforming reaction to be taken in the reforming space 5.

The burner 6 is connected to an improved fuel supply pipe 7a and to a burner fuel supply pipe 7c, which respectively supply the burner oxidation agent and the burner fuel to the burner 6.

A conventional fuel cell power plant is provided with a containment vessel 8 which surrounds the fuel cell main unit 1 so that the oxidation agent and the fuel supplied to the fuel cell main unit 1 is contained and so that the required chemical reaction takes place inside the fuel cell main unit 1.

The containment vessel 8 contains the fuel or the oxidation agent inside the fuel cell main unit 1 as described above and therefore in conventional fuel cell power plants the injection of an inert gas such as nitrogen or the like to the containment vessel has been required to maintain it at a higher pressure than the fuel cell main unit.

As disclosed in Japanese Patent Application Laid-Open No. 226664-1990, a conventional power plant is configured so that a burner exhaust gas from the burner 6 is used to economically supply an inert gas to the containment vessel 8.

More specifically, a conventional fuel cell power plant has the burner 6 and the containment vessel 8 connected by a purge gas supply pipe 2c in a configuration where the burner exhaust gas from the burner 6 is introduced to the containment vessel 8 as the purge gas.

The introduced burner exhaust gas is discharged to outside of the system by a purge gas discharge pipe 3c and via a pressure maintaining means not shown in the figure.

In general, an anode space where the fuel gas is supplied to anode electrodes, and a cathode space where the oxidation gas is supplied to cathode electrodes are airtightly constructed in the fuel cell main unit 1 but the long lapse of time with extended operation makes the leakages of a slight amount of oxygen or fuel from the cathode space or the anode space into the containment vessel 8 unavoidable. Thus with the configuration described above, the reformer burner exhaust gas is either periodically or continuously introduced via the purge gas supply pipe 2c to the containment vessel 8 as the purge gas so that it is possible to remove fuel or oxygen which has remained in the containment vessel 8.

However, the combustion temperature and the fuel amount which are the conditions for combustion of the burner 6 vary according to the requirements of plant operation such as load changes and so if the oxygen which is not supplied via the burner oxidation agent supply pipe 7b is completely consumed, be an excess of oxygen will be remained in the burner exhaust gas.

Accordingly, in addition to the major inert gas component such as nitrogen, no small density of oxygen is sometimes included in the burner exhaust gas.

If fuel which has leaked from the fuel cell main unit 1 to inside the containment vessel 8 when the burner exhaust gas which includes oxygen has been introduced into the containment vessel 8, the presence of oxygen and fuel may create a danger that an abnormal chemical reaction such as combustion or explosion will take place inside the containment vessel 8.

Furthermore, when oxygen which is included in the burner exhaust gas, leaks into the fuel cell main unit 1, there may be the danger that the normal electro-chemical reaction between the anode electrodes and the cathode electrodes to produce electrical power will be hampered inside the fuel cell main unit 1.

FIGS. 2-5 show the different conventional technologies. Moreover, the reference numerals in the figures correspond to those of FIG. 1.

This fuel cell power plant is normally provided with a fuel cell main unit 1 which generates a current by the chemical reaction shown in FIG. 2, and a reformer 4 which generates a fuel gas which is supplied to the fuel cell main unit 1.

The fuel reformer 4 is provided with a reformer space 5 comprised of one or more reforming tubes, and a burner space 6 which comprises a burner, with the steam and reforming fuel being introduced as a mixed gas, heated inside the reforming space 5 and reformed into a hydrogen-rich gas, and supplied via the pipe 2b to the anode space 1a of the fuel cell main unit 1.

The fuel cell main unit 1 is provided with an anode space 1a where the fuel gas is supplied to anode electrodes and a cathode space 1b where the oxidation gas is supplied to cathode electrodes and the fuel cell main unit 1 is separated from the atmospheric environment by the containment vessel 8 in which the fuel cell main unit 1 is contained.

The oxidation agent of oxygen or air is supplied from the oxidation agent supply pipe 2a to the cathode space 1b, and the hydrogen rich gas and the oxygen react inside the fuel cell main unit 1. The used hydrogen and the used oxidation-agent are then respectively discharged via the pipes 9a and 9b and supplied to the burner 6 of the fuel reformer 4. The used fuel and used oxidation-agent which are introduced to the burner 6 are combusted at the burner 6 supplying with reforming heat to the reforming space and the burner exhaust gas is then led to outside of the system via the pipe 2d.

In addition, one portion of the exhaust gas from the burner 6 is supplied as a purge gas to each of the containment vessel 8 via the pipe 2c. The purge gas which is supplied to the containment vessel 8 is discharged via the pipe 9 which joins the pipe for the used oxidation-agent from the cathode space.

In general, the anode space 1a and the cathode space 1b of the fuel cell main unit 1 have a sufficient gas seal capability but during the long lapse of time with extended operation, there may be cases where oxidation agent and fuel will leak from the fuel cell main unit 1 to the containment vessels 8 and remain there. This may create the danger of an abnormal chemical reaction such as combustion or explosion in the containment vessel 8. In order to avoid the possibility of this danger, the containment vessel 8 is periodically or continuously purged.

It is desirable that the purge gas be an inert gas such as nitrogen or the like which does not react with the fuel or the oxidation agent but it is not easy to store a large quantity of nitrogen at high pressure or as liquid nitrogen.

There is a known method (Japanese Patent Application Laid-Open No. 226664-1990) wherein the exhaust gas of the burner 6 of the fuel reformer 4 is used as the purge gas.

However, the exhaust gas of the burner 6 of the fuel reformer 4 includes as one portion an oxygen component and a flammable component such as the residual hydrogen or other hydrocarbons. Since conditions and quantity of the combustion to be taken at the reformer burner can vary largely in accordance with the load level of the plant, the amounts of these residual oxygen or flammable components in the burner exhaust gas generally fluctuate largely in accordance with the load level. Accordingly, depending upon the plant operating conditions there may be a danger that the oxygen component and the flammable component of the waste gas of this purge gas as a portion of the burner exhaust gas in the containment vessel, may normally or temporarily exceed the allowable values and therefore produce an abnormal reaction with the fuel and the oxygen which have leaked from the anode space or the cathode space into the containment vessel 8.

FIG. 3 is a system diagram showing a third example of a conventional fuel cell power generation plant, and in the figure, those portions which are shown with the same reference numerals as portions of the configuration of FIGS. 1 and 2 are either the same or similar and so corresponding descriptions thereof are omitted.

As shown in FIG. 3, a power generation plant according to this third example is provided with a blower 2e to the purge gas supply pipe 2c which branches off from the pipe 2d to discharge the purge gas to the containment vessel 8.

This purge gas is supplied to the containment vessel 8 for the same purpose as described in FIG. 2, that is, to eliminate the danger of an abnormal chemical reaction such as combustion or explosion to be occurred in the containment vessel 8. There are many instances where nitrogen or some other inert gas which has no reactivity with the fuel or the oxidation agent is used as the purge gas but such inert gases consume a large running cost and so less economical. To improve this, a burner exhaust gas is reused as a purge gas. Accordingly, the blower 2e is driven so that the pressure inside the containment vessel 8 is maintained at a certain value so that the purge gas can be supplied in a suitable status with respect to the anode space 1a and the cathode space 1b.

The following is a description of a conventional fuel cell power plant according to a fourth example. In FIG. 4, those portions which are shown with the same reference numerals as portions of the configuration of FIGS. 1-3 are either the same or similar and so corresponding descriptions thereof are omitted.

As shown in FIG. 4, the power plant of this fourth example also has the fuel processing apparatus 10 and the air processing apparatus 13. The fuel processing apparatus 10 is configured with a high-temperature carbon monoxide shift converter 11 and a low-temperature carbon monoxide shift converter 12 which reduce the carbon monoxide concentration in the hydrogen-rich gas which is supplied from the fuel reformer 4. The carbon monoxide high-temperature shift converter 11 uses a shift reaction at 400° C. to lower the concentration of carbon monoxide and to raise the concentration of hydrogen. In addition, the low-temperature carbon monoxide shift converter 12 uses a shift reaction at 200° C. to further raise the concentration of hydrogen in the hydrogen-rich gas.

When air is used as the oxidation agent of the fuel cell main unit 1, the air processing apparatus 13 compresses the air of the atmosphere so as to promote reaction as an oxidation agent and supplies it to the cathode space 1b and is for example, comprised from an air compression apparatus such as a compressor or a blower.

FIG. 5 shows a conventional fuel cell power plant according to a fifth example, and in the figure, those portions which are shown with the same reference numerals as portions of the configuration of FIGS. 1-4 are either the same or similar and so corresponding descriptions thereof are omitted.

In FIG. 5, the purge gas is supplied from the purge gas supply source 15 to the containment vessel 8 of the fuel cell main unit 1 via the purge gas supply pipe 2c. The reason for the supply of this purge gas is omitted as it has already been given in the preceding description. Moreover, when one portion of the burner exhaust gas which is exhausted from the burner of the reformer is used as the purge gas, the configuration for this is the same as that shown in FIGS. 1-4.

The examples shown in FIGS. 1-5 all have the problem that there may be dangers of an abnormal chemical reaction such as combustion or explosion to take place inside the containment vessel, where such the abnormal chemical reaction will be occurred under the mixture condition of fuel or oxidation agent which have leaked from the anode space or cathode space into the containment vessel 8, with the oxygen component and the flammable component included in the purge gas branched off from the burner exhaust gas.

Furthermore, when oxygen which is included in the burner exhaust gas, leaks into the fuel cell main unit 1, there may be the danger that the normal electro-chemical reaction between the anode electrodes and the cathode electrodes to produce electrical power will be hampered inside the fuel cell main unit 1.

SUMMARY OF THE INVENTION

An object of the present invention is to provide a fuel cell power plant which eliminates the problems inherent in the conventional technology and definitely remove an oxygen component and a flammable component which are included in a purge gas which is supplied to a containment vessel of a fuel cell main unit, and which enables the containment vessel to be safely and effectively purged. Moreover, in this specification, the terms "flammable component" and "oxygen component" are used in the sense of "combustion element".

In addition, the present invention has as an object the provision of a fuel cell power plant which enables safe purging of the containment vessel while maintaining the sound functioning of the fuel cell, in other words, the normal electro-chemical reaction to produce electrical power.

In order to achieve these objectives, the fuel cell power plant as a basic concept of the present invention is a fuel cell power plant configured to supply a fuel of a fuel cell main unit by a fuel reformer and houses the fuel cell main unit in a containment vessel, with the connection by a purge gas supply pipe of the containment vessel and fuel reformer introducing the waste gas of the fuel reformer as the purge gas to inside the containment vessel, and furthermore, has a combustion element removal means provided along the purge gas supply pipe so that combustion elements are effectively removed from the purge gas prior to the introduction of the purge gas to inside the containment vessel.

A power plant of a first aspect of the invention is provided with an oxygen removal apparatus which effectively removes oxygen as the combustion element, from the purge gas, and which is provided along a purge gas supply pipe between the reformer burner and containment vessel.

A fuel cell power plant of a second aspect of the invention is a fuel cell power plant provided with a fuel cell main unit, a containment vessel which houses the fuel cell main unit, and an improver which generates reformed gas which is supplied to the fuel cell main unit, and is characterized in being provided with a gas separation apparatus for the separation of carbon dioxide gas from the reformed gas or waste fuel gas which is discharged from the fuel cell main unit, and which supplies carbon dioxide gas separated by the gas separation apparatus, as a purge gas to the containment vessel.

A fuel cell power plant of a third aspect of the invention is a fuel cell power plant provided with a fuel cell main unit, a containment vessel which houses the fuel cell main unit, and an improver which generates reformed gas which is supplied to the fuel cell main unit, and is characterized in being provided with a dehumidifier apparatus which supplies an exhaust gas which is discharged from a burner portion of the reformer, as a purge gas to the containment vessel after it has been dehumidified by the dehumidification apparatus.

A fuel cell power plant of a fourth aspect of the present invention is a fuel cell power plant produced with a fuel cell main unit, a containment vessel which houses the fuel cell main unit, and an improver which generates reformed gas which is supplied to the fuel cell main unit, and is characterized in being provided with a catalytic burner for combusting the exhaust gas from the reformer burner with the reformed gas from the reforming space, and a dehumidifier for dehumidifying the discharge gas of the catalytic burner, then providing that discharge gas as a purge gas to the containment vessel.

A fuel cell power plant of a fifth aspect of the invention is a fuel cell power plant provided with a fuel cell main unit, a containment vessel which houses the fuel cell main unit, and a reformer which generates reformed gas which is supplied to the fuel cell main unit, and is characterized in being provided with a catalytic burner, with the reformed gas and the oxidation agent gas being combusted in a catalytic burner and an exhaust gas discharged from the catalytic burner being supplied as a purge gas to the containment vessel.

A fuel cell power plant of a sixth aspect of the invention is a fuel cell power plant provided with a fuel cell main unit, a containment vessel which houses the fuel cell main unit, and is characterized in being provided with an oxygen removal apparatus which removes oxygen contained in the air, and supplies air which has had oxygen removed by the oxygen removal apparatus, as a purge gas to the containment vessel.

A fuel cell power plant of the first aspect of the invention is provided with an oxygen removal apparatus along a purge gas supply pipe, and which effectively removes oxygen from a purge gas prior to the introduction of a purge gas to a containment vessel, thereby enabling the sound functioning of the fuel call and safely purging the containment vessel.

A fuel cell power plant of the second aspect of the invention uses a gas separation apparatus to separate carbon dioxide gas from a waste fuel gas discharged from a fuel cell main unit, or from a reformed gas, and to supply the carbon dioxide gas as a purge gas to the containment vessel.

In addition, a fuel cell power plant of the third aspect of the invention uses a dehumidifier to dehumidify a waste gas which has been discharged from the reformer burner, and then supplies it as a purge gas to the containment vessel.

A fuel cell power plant according to the fourth aspect of the invention uses a catalytic burner to combust a reformed gas which is discharged from a reforming space of a reformer, and an exhaust gas which is discharged from a reformer burner, and to supply a exhaust gas discharged from said catalytic burner to a containment vessel as a purge gas after it has been dehumidified by a dehumidifier.

A fuel cell power plant of the fifth aspect of the invention combusts a exhaust gas discharged from a reformer burner with a reformed gas discharged from a reforming space of a reformer, in a catalytic burner, and supplies a exhaust gas discharged from a catalytic burner, as a purge gas to said containment vessel.

A fuel cell power plant according to the sixth aspect of the invention supplies air which has had oxygen removed by an oxygen removal apparatus, as a purge gas to said containment vessel.

As has been described above, the fuel cell power plant of the present invention is a fuel cell power plant configured to supply a fuel of a fuel cell main unit by a fuel reformer and houses said fuel cell main unit in a containment vessel, with the connection by a purge gas supply pipe of the containment vessel and fuel reformer introducing the exhaust gas of said fuel reformer burner as the purge gas to inside said containment vessel, and furthermore, has a combustion element removal means provided along said purge gas supply pipe so that in the particular case of the first aspect, combustion elements (oxygen) are effectively removed from said purge gas prior to the introduction of said purge gas to inside said containment vessel, thereby enabling the sound functioning of the fuel cell.

In addition, a power plant according to the second aspect of the invention uses a gas separation apparatus and the carbon dioxide gas which is separated by the gas separation apparatus is used as the purge gas to therefore remove the flammable component and the oxygen component in the purge gas to the containment vessel of the fuel cell main body, and therefore enable the containment vessel to be safely purged.

In addition, a fuel cell power plant of the third aspect of the invention supplies a exhaust gas discharged from a reformer burner, as a purge gas and also prevents the generation of drain.

In addition, a fuel cell power plant of the fourth aspect of the invention is provided with a dehumidifier and a catalytic burner portion inside a purge entrance pipe and so even if air for combustion is supplied excessively in order to perform stable combustion in a reformer burner, it is possible for exhaust gas from a catalytic burner portion to be supplied to a containment vessel as a purge gas which does not include an oxygen component or which has a safely low concentration of oxygen.

A fuel cell power plant according to the fifth aspect of the invention is provided with a catalytic burner to combust air and a hydrogen-rich gas from reformed gas, and to use this combustion exhaust gas as a purge gas and therefore enable a purge gas having a gas composition having an always low concentration of oxygen to be obtained irrespective of the plant load level and operation status, and to enable safe and sufficient purging of the containment vessel to be performed for any status of plant operation.

A fuel cell power plant according to the sixth aspect of the invention is provided with an oxygen removal apparatus which removes oxygen in air and therefore enables the containment vessel to be purged by air which has a lowered oxygen component, therefore providing a fuel cell power plant which has a low running cost.

DESCRIPTION OF THE DRAWINGS

In the appended figures.

DETAILED DESCRIPTION OF THE PREFERRED EMBODIMENTS

The following is a detailed description of preferred embodiments of the fuel cell power plant of the present invention, with reference to the appended drawings.

Figure 6:
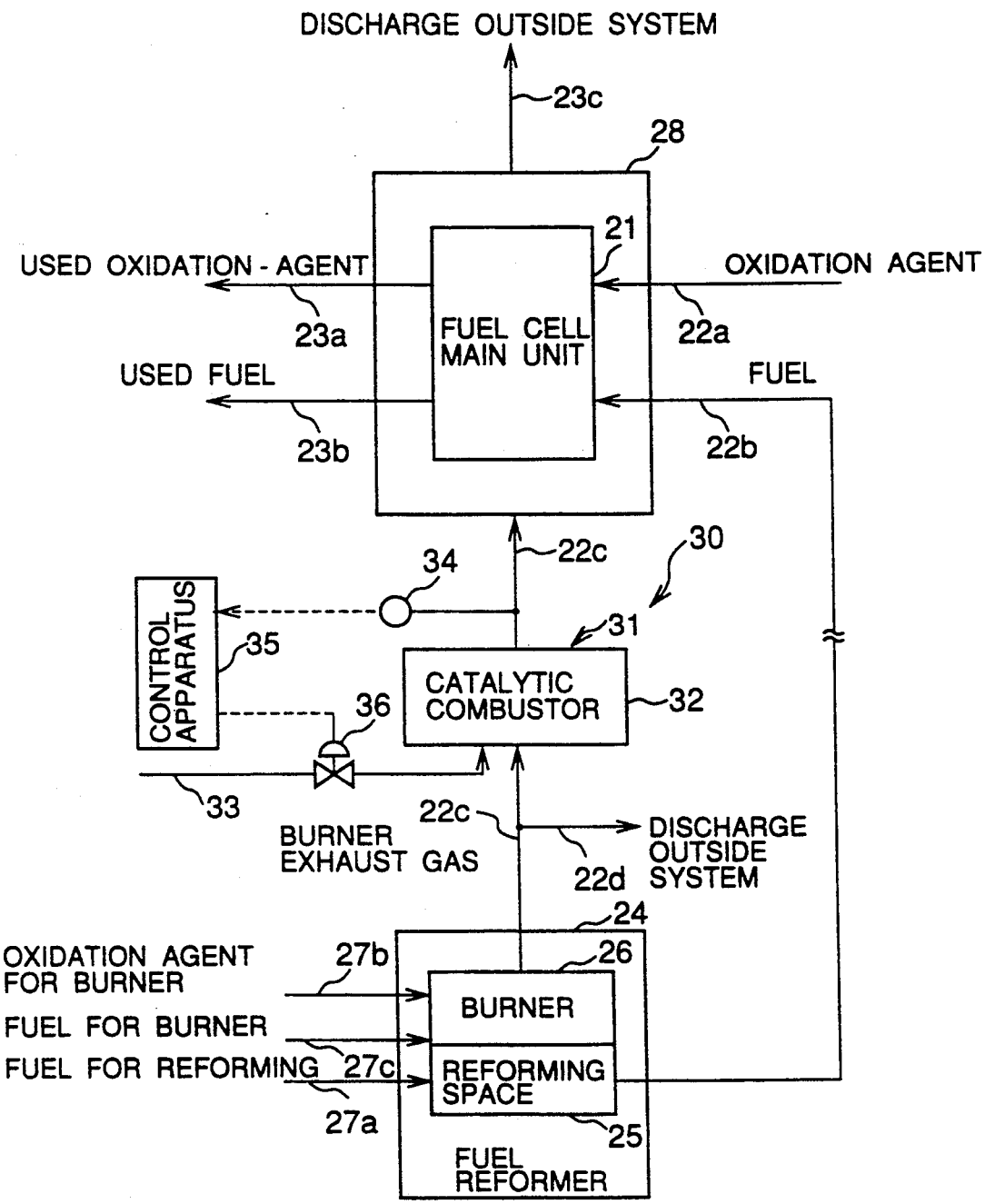
FIG. 6 is an outline block diagram of a first embodiment of a fuel cell power plant according to the present invention.

FIG. 6 is an outline block diagram of a fuel cell power plant according to a first embodiment of the present invention.

In the same manner as the conventional technology, the fuel cell power plant of the first embodiment has the fuel cell main unit 21 connected to a oxidation agent supply pipe 22a and a fuel supply pipe 22b, the connection of the fuel supply pipe 22b to the fuel reformer 24 supplies fuel from the fuel reformer 24 and via the fuel supply pipe 22b.

In addition, the fuel cell power plant according to a first embodiment of the present invention has the fuel cell main unit 21 housed in the containment vessel 28 and this containment vessel 28 is connected to a reformer burner 26 via a purge gas supply pipe 22c so that exhaust gas of the burner 26 is introduced as a purge gas to inside the containment vessel 28 in a configuration where the inside of the containment vessel 28 is maintained at a required pressure.

Furthermore, the fuel cell power plant according to a first embodiment of the present invention is provided along the purge gas supply pipe 22c, with an oxygen removal means 30 which effectively removes oxygen from the purge gas prior to the introduction of the purge gas to the containment vessel 28.

The oxygen removal means 30 is configured so as to remove the oxygen included in the purge gas, by the burner means 31.

The burner means 31 is provided with a catalytic burner 32 along the purge gas supply pipe 22c.

The burner means 31 is configured so as to consume the oxygen which is included in the purge gas which has been sent from the reformer burner 26 via the purge gas supply pipe 22c, to combust the fuel which has been sent from the fuel supply pipe 33, in the catalytic burner 32.

In addition, the burner means 31 has the purge gas supply pipe 22c downstream of the catalytic burner 32, provided with an oxygen concentration measurement means 34 to measure the oxygen concentration after combustion.

Furthermore, the burner means 31 is provided with a control apparatus 35 which is configured as to drive the control valve 36 and adjust the amount of fuel so that the value for the measured concentration of oxygen is substantially zero.

The following description describes the purging of the inside of the containment vessel 28 using a fuel cell power plant according to a first embodiment of the present invention.

As described for the prior art, the fuel cell main unit 21 requires hydrogen rich gas as the fuel and this hydrogen rich gas is generated in the reforming space 25 of the fuel reformer 24 by means of reforming the methane gas or other hydrocarbon fuels, and this hydrogen rich gas is supplied to the fuel cell main unit 21 via the fuel supply pipe 22b.

On the other hand, in addition to hydrogen, the fuel cell main unit 21 requires oxygen as the oxidation agent, and this oxygen agent such as air is supplied via the oxidation agent supply pipe 22a.

Generating the hydrogen rich gas in the fuel reformer 24 involves passing the methane gas or other hydrocarbon fuel gas for reforming through a reforming space 25 via a reforming fuel supply pipe 27a, and introducing a fuel oxidation agent such as air and a burner fuel to the reformer burner 26 via the burner fuel supply pipe 27c, and the burner heat is supplied to the reforming reaction to be occurred in the reforming space 25.

On the other hand, the exhaust gas which is exhausted from the burner 26 has one portion removed and discharged to outside of the system, while the remainder is sent to the catalytic burner 32.

In the catalytic burner 32, the fuel is supplied via the fuel supply pipe 33 and so the fuel is combusted inside the catalytic burner 32 and the oxygen which is included in the reformer burner exhaust gas is consumed in the combustion.

The control apparatus 35 opens the control valve 36 to increase the amount of fuel supplied if the oxygen concentration in the exhaust gas which flows through the purge gas supply pipe 22c has not dropped to a required level, and increases the amount of oxygen consumed in the catalytic burner 32.

Conversely, if the oxygen concentration in the exhaust gas has dropped to a required level, the control apparatus 35 maintains the amount of opening of the control valve 36.

In this manner, the control apparatus drives the control valve 36 so that the oxygen concentration of the exhaust gas which flows along the purge gas supply pipe 22c is practically zero, or is less than a required concentration.

The concentration of the oxygen which is included in the exhaust gas which flows into the containment vessel 28 is either practically zero or has dropped to less than a required concentration and so for example, even if fuel has leaked from the fuel cell main unit 21 into the containment vessel 28, this leaked fuel does not cause an abnormal reaction and can be safely purged from the containment vessel 28.

The following is a description of a second embodiment of a fuel cell power plant according to the present invention. Moreover, those portions which are shown with the same reference numerals as portions of the first embodiment are either the same or similar and so corresponding descriptions thereof are omitted.

Figure 7:
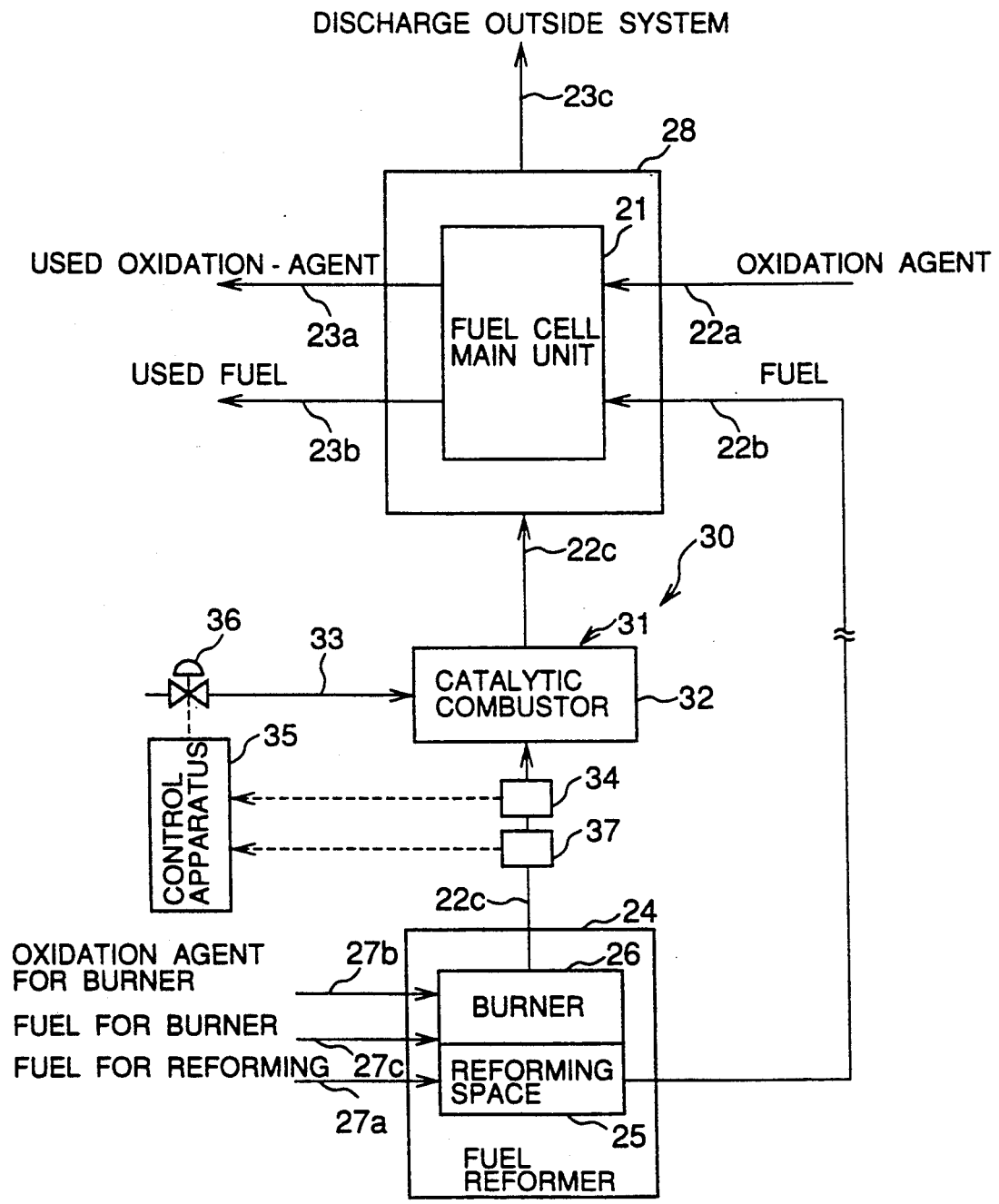
FIG. 7 is an outline block diagram of a second embodiment of a fuel cell power plant according to the present invention.

FIG. 7 is an outline block diagram of a second embodiment of a fuel cell power plant according to the present invention.

In the second embodiment of a fuel cell power plant according to the present invention, an oxygen removal apparatus is provided along the purge gas supply pipe 22c in the same manner as for the first embodiment, in a configuration whereby the oxygen is effectively removed from the purge gas prior to the introduction of the purge gas to the containment vessel 28.

The oxygen removal means 30 is configured by a burner means 31 which removes the oxygen which is included in the purge gas.

The burner means 31 has a catalytic burner 32 provided along the purge gas supply pipe 22c and the catalytic burner 32 uses the oxygen which is included in the purge gas from the purge gas supply pipe 22c to combust the fuel which is sent from the fuel supply pipe 33.

In addition, the burner means 31 has a flow measurer 37 and an oxygen concentration measurer 34 provided to the purge gas supply pipe 22c on the upstream side of the catalytic burner 32 and measure the flow amount and the oxygen concentration of the burner exhaust gas prior to it being burnt in the catalytic burner 32.

The burner means 31 is provided with a control apparatus 35, which uses the measured values for the oxygen concentration and the flow amount to calculate the amount of oxygen included in the waste gas and to drive the control valve 36 so that practically all of the calculated amount of oxygen is consumed in catalytic burner 32, and thereby adjust the amount of fuel.

The following is a description of the purging of the inside of the containment vessel 28 in the fuel cell power plant according to a second embodiment of the present invention.

As described for the first embodiment, the exhaust gas which is exhausted from the reformer burner 26 has one portion of the exhaust gas removed to and discharged to outside of the system while the remainder is sent to the catalytic burner 32 but in this second embodiment, the values for the gas flow and the oxygen concentration measured by the flow measurer 27 and oxygen concentration measurer 34 are used to measure the concentration of oxygen included in the waste gas prior to it entering the catalytic burner 32.

The control apparatus 35 uses these values for the flow amount and the oxygen concentration to calculate the amount of oxygen and to also calculate the amount of fuel required to consume the oxygen amount.

Then, the control apparatus 35 drives the control valve 36 so that amount of fuel enters the catalytic burner 32.

Accordingly, fuel to exactly the amount whereby the oxygen which is included in the purge gas supply pipe 22c is supplied to the catalytic burner 32 via the fuel supply pipe 33 and so an exhaust gas from which practically all of the oxygen has been removed is discharged.

The concentration of the oxygen which is included in the exhaust gas which flows into the containment vessel 28 is practically zero and so for example, even if fuel flows from the fuel cell main unit 21 into the containment vessel, this leaked fuel does not react abnormally and the containment vessel 28 can be safely purged.

Figure 1:
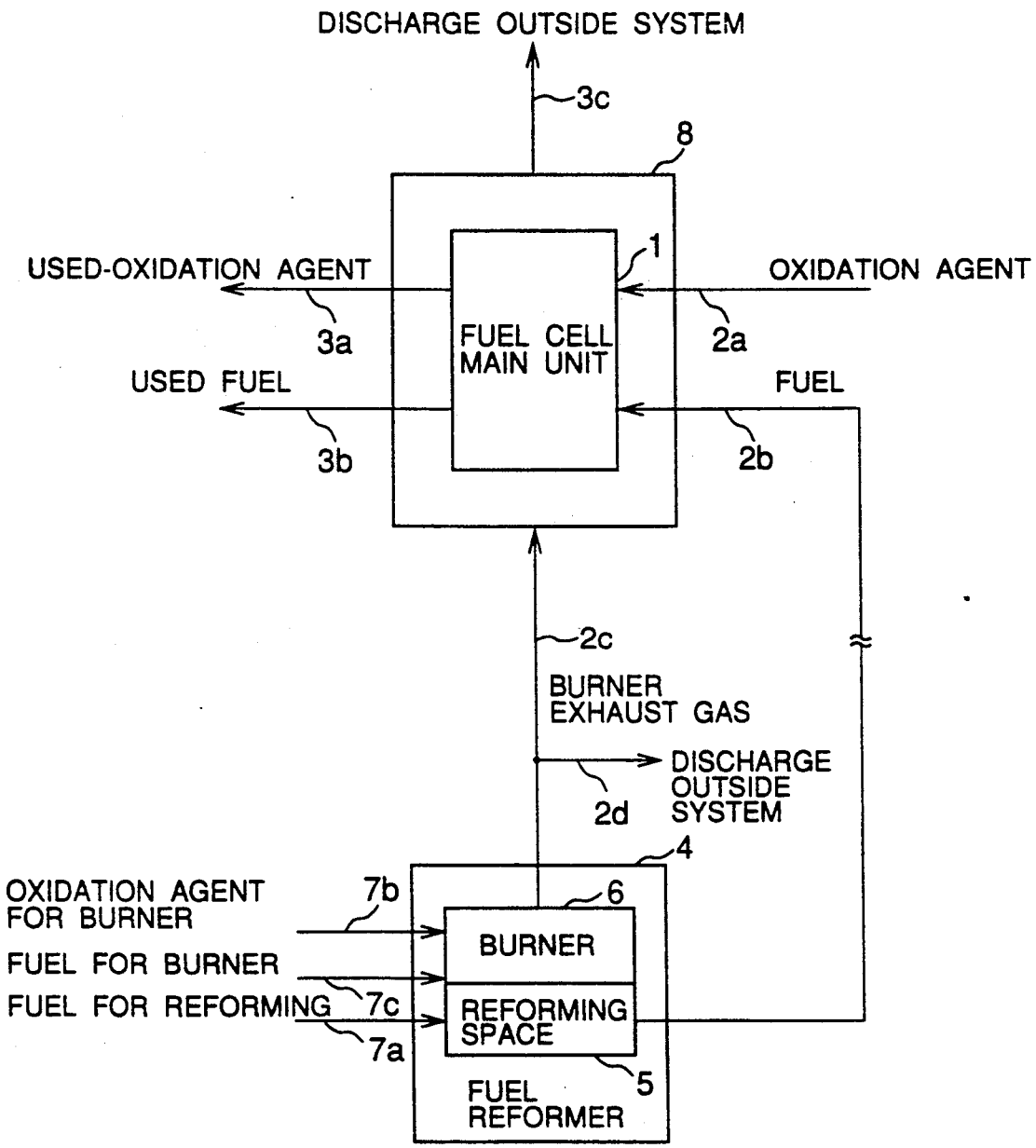
FIG. 1 is an outline block diagram of a first example of a conventional fuel cell power plant.
Figure 2:
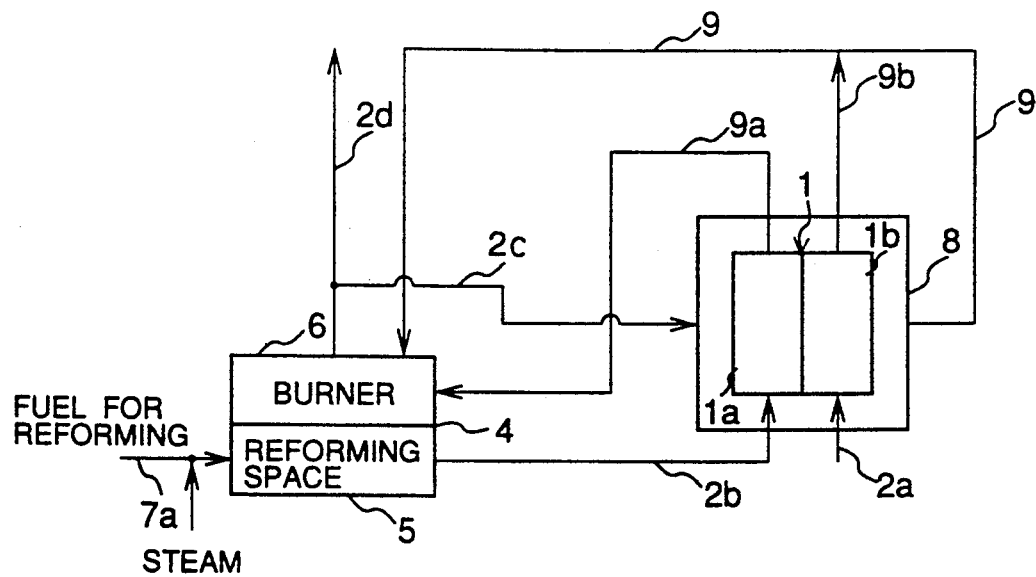
FIG. 2 is a system diagram showing a second example of a conventional fuel cell power plant.
Figure 8:
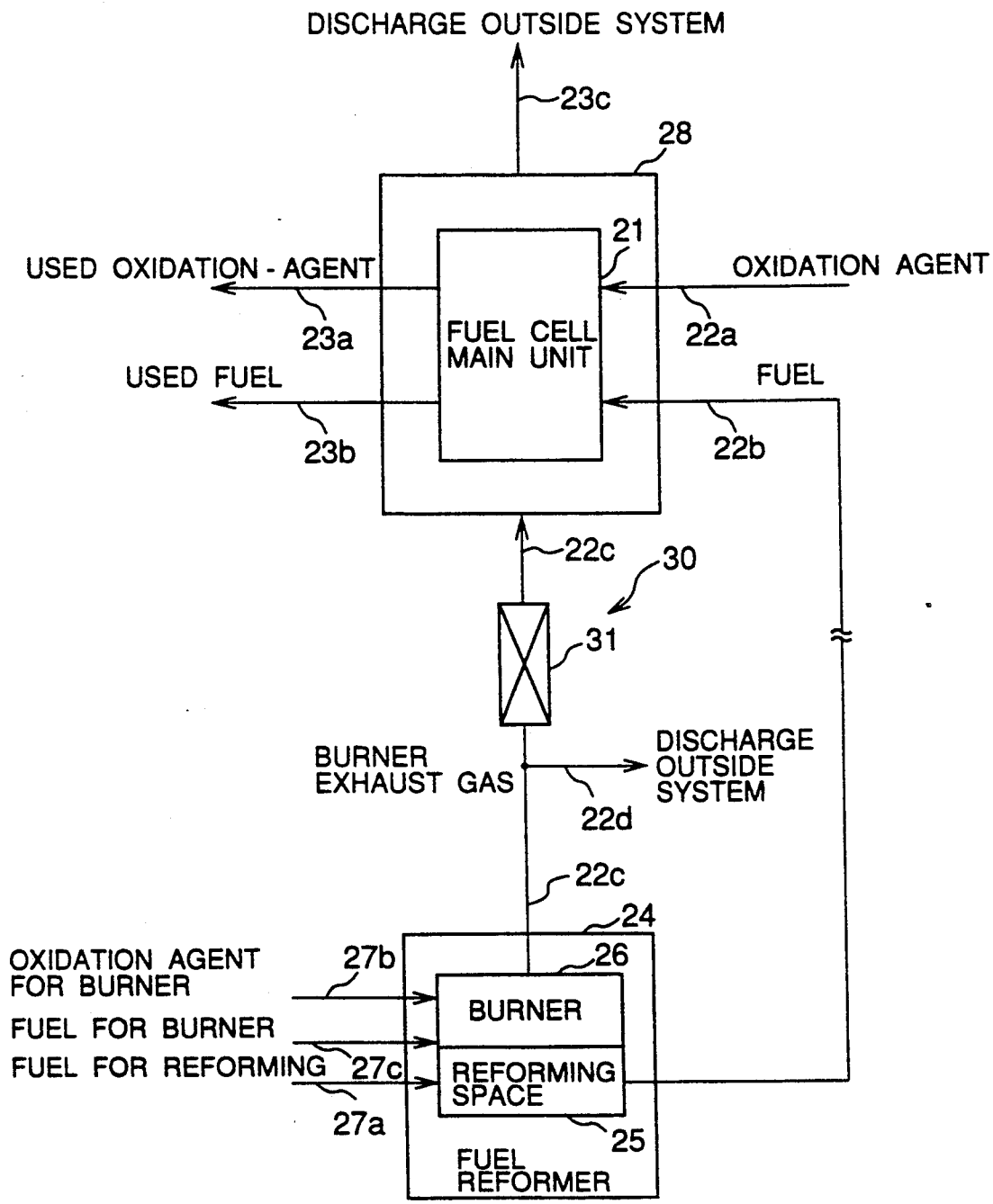
FIG. 8 is an outline block diagram of a third embodiment of a fuel cell power plant according to the present invention.

FIG. 8 is an outline block diagram of a third embodiment of a fuel cell power plant according to the present invention, and in the figure, those portions which are shown with the same reference numerals as portions of the configuration of FIGS. 1 and 2 are either the same or similar and so corresponding descriptions thereof are omitted.

In the third embodiment of a fuel cell power plant according to the present invention, an oxygen removal apparatus is provided along the purge gas supply pipe 22c in the same manner as for the first and second embodiments, in a configuration whereby the oxygen is effectively removed from the purge gas prior to the introduction of the purge gas to the containment vessel 28.

The oxygen removal means 30 is configured so that the oxygen which is included in the purge gas is removed by the oxygen removal means 31.

The oxygen removal means 31 can be an oxygen absorbing agent which absorbs oxygen, or it can be an oxygen reactive agent which causes a chemical reaction with the oxygen to consume the oxygen.

The following is a description of the operation for purging the containment vessel 28 of a fuel cell power plant according to a third embodiment of the present invention.

As described for the first and second embodiments, with the exception of one portion which is discharged to outside of the system, the exhaust gas which is exhausted from the reformer burner 26 is supplied to the oxygen removal means 31 where the oxygen which is included in the exhaust gas is trapped or consumed, so that the amount of oxygen which is included in the waste gas is practically zero at the exit of the oxygen removal means 31.

The concentration of oxygen which is included in the exhaust gas which enters into the containment vessel 28 is practically zero and so for example, even if fuel flows from the fuel cell main unit 21 into the containment vessel, this leaked fuel does not react abnormally and the containment vessel 28 can be safely purged.

In this previously described second embodiment, the flow measurer 37 and oxygen concentration measurer 34 are arranged in the direction of flow of the waste gas but the order of arrangement is arbitrary.

The following is a description of the fourth through nineteenth embodiment of a fuel cell power plant according to the present invention and with reference to FIGS. 9 through 24.

Figure 9:
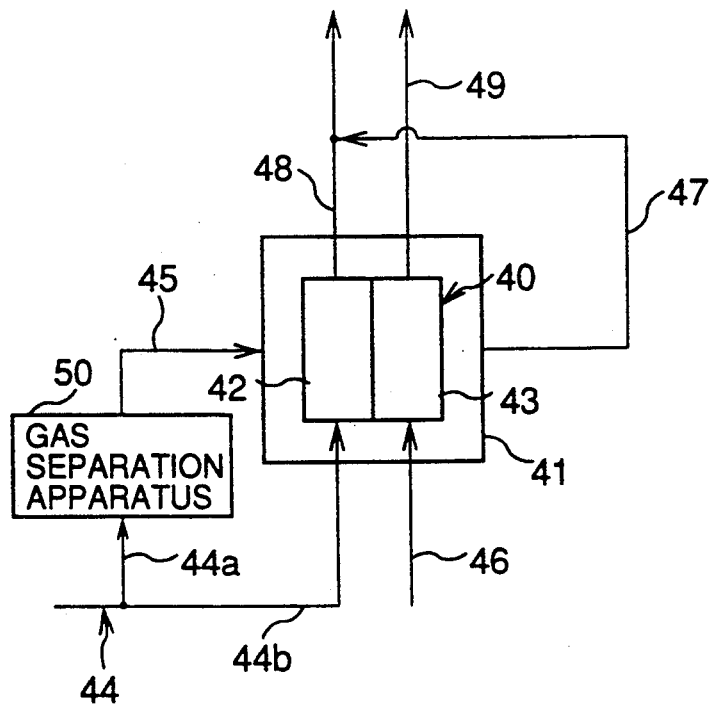
FIG. 9 is a system diagram showing a fuel cell power plant according to a fourth embodiment of the present invention.

FIG. 9 is a system diagram showing a fuel cell power plant according to a fourth embodiment of the present invention.

In FIG. 9, the reference numeral 40 indicates a fuel cell main unit 40 which generates a current by producing an electrochemical reaction, and this fuel cell main unit 40 is housed inside a containment vessel 41. The fuel cell main unit 40 is configured so that a cathode space 43 and an anode space 42 which contain porous electrode materials sandwich an electrolyte which is not shown in the figure. A hydrogen-rich gas which is generated by reforming of methane gas or the like, is supplied as fuel to the anode space 42 after passing along an external pipe 44, while oxygen or air as the oxidation agent is supplied as the oxidation agent to the cathode space 43 via an external pipe 46.

In addition, the fuel and the oxidation agent react in the fuel cell main unit 40 and waste fuel and waste oxidation agent are discharged via the pipes 48 and 49.

In addition, one portion of the reformed gas which is supplied to the pipe 44 is supplied to a gas separation apparatus 50 via the pipe 44a as a source gas for the purge gas, and has the carbon dioxide separated from it. This separated carbon dioxide is supplied to the containment vessel 41 via a pipe 45 as the purge gas, and the purge gas from the containment vessel 41 is discharged via the purge waste gas pipe 47 which joins the waste fuel system pipe 48.

Moreover, the gas separation apparatus 50 can use some other separation method such a chemical or physical method having a separation film for example.

The following is a description of a fourth embodiment.

One portion of the gas which flows through the pipe 44 of the reformed gas system has the carbon dioxide separated from it with the gas separation apparatus 50 which is a porous film or the like. The separated carbon dioxide is supplied to the containment vessel 41 as the purge gas, and either performs constant or periodic purging of the fuel and the oxidation agent which has the possibility of remaining inside the containment vessel 41. The purge gas is discharged via the pipe 47, and joins the pipe 48 of the waste fuel system.

According to this configuration of the fourth embodiment, there is provided the gas separation apparatus 50 to separate the carbon dioxide and so it is possible to separate the carbon dioxide from one portion of the reformed gas with this gas separation apparatus 50. The supply of this carbon dioxide as the purge gas to the containment vessel 41 enables the removal of flammable components and the oxygen component in the purge gas without there being any adverse influence. As a result, the danger of there being an abnormal reaction due to the fuel and the oxidation agent leaking into the containment vessel 41 from the fuel cell main unit 40 is avoided, and it is possible to have the safe purging of the containment vessel 41.

Figure 10:
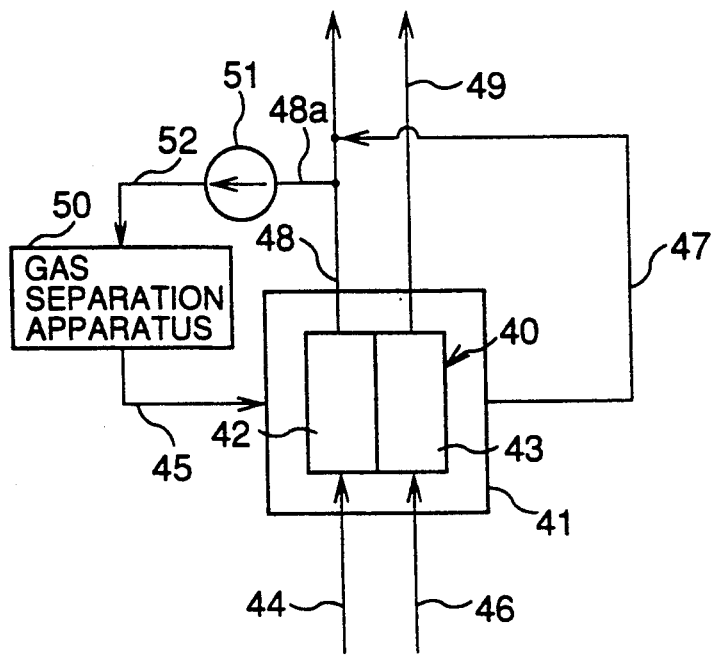
FIG. 10 is a system diagram showing a fuel cell power plant according to a fifth embodiment of the present invention.

The following is a description of a fifth embodiment of the present invention, with reference to FIG. 10.

In FIG. 10, one portion of the waste fuel which is discharged from the anode space 42 of the fuel cell main unit 40 is discharged via the pipe 48 and is supplied to a blower 51. After the pressure has been raised by this blower 51, the waste fuel is supplied to the gas separation apparatus 50 via the pipe 52, and the carbon dioxide is separated. The operation after the gas separation apparatus 50 is the same as that of the fourth embodiment.

According to this fifth embodiment, it is possible to separate the carbon dioxide from the waste fuel which is discharged from the fuel cell main unit 40 and therefore effectively generate a purge gas.

Moreover, in this fourth and fifth embodiment, the purge gas which is discharged from the containment vessel 41 passes through the pipe 47 and joins the pipe 48 of the waste fuel system but it can alternatively join the pipe 49 of the waste air system, or can be discharged to outside.

The following is a description of a sixth through ninth embodiment of the present invention, with reference to FIGS. 1 through FIG. 14. These sixth through ninth embodiment of the present invention are for the elimination of the conventional problems described below.

Figure 3:
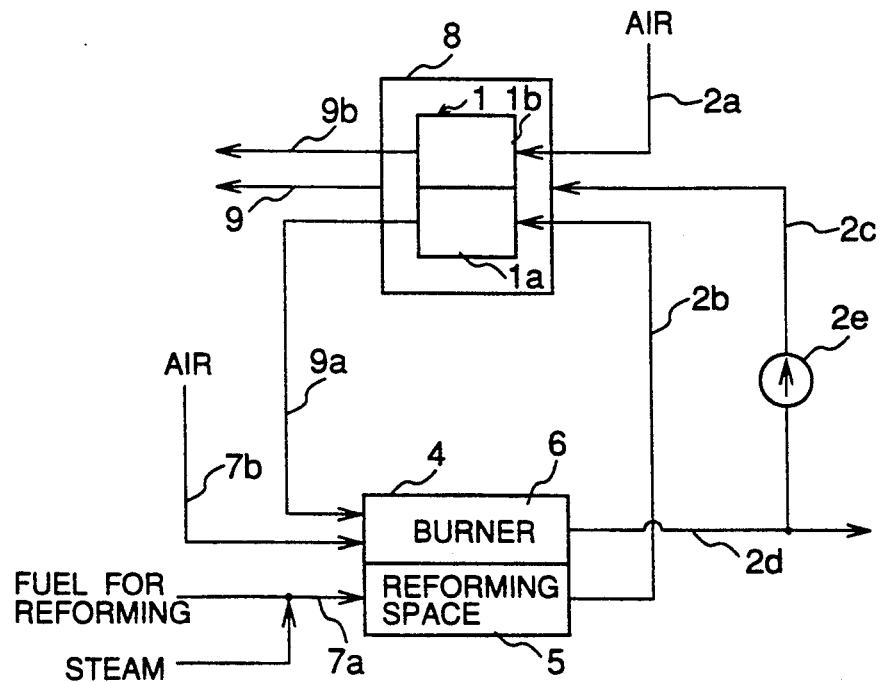
FIG. 3 is a system diagram showing a third example of a conventional fuel cell power plant.
Figure 4:
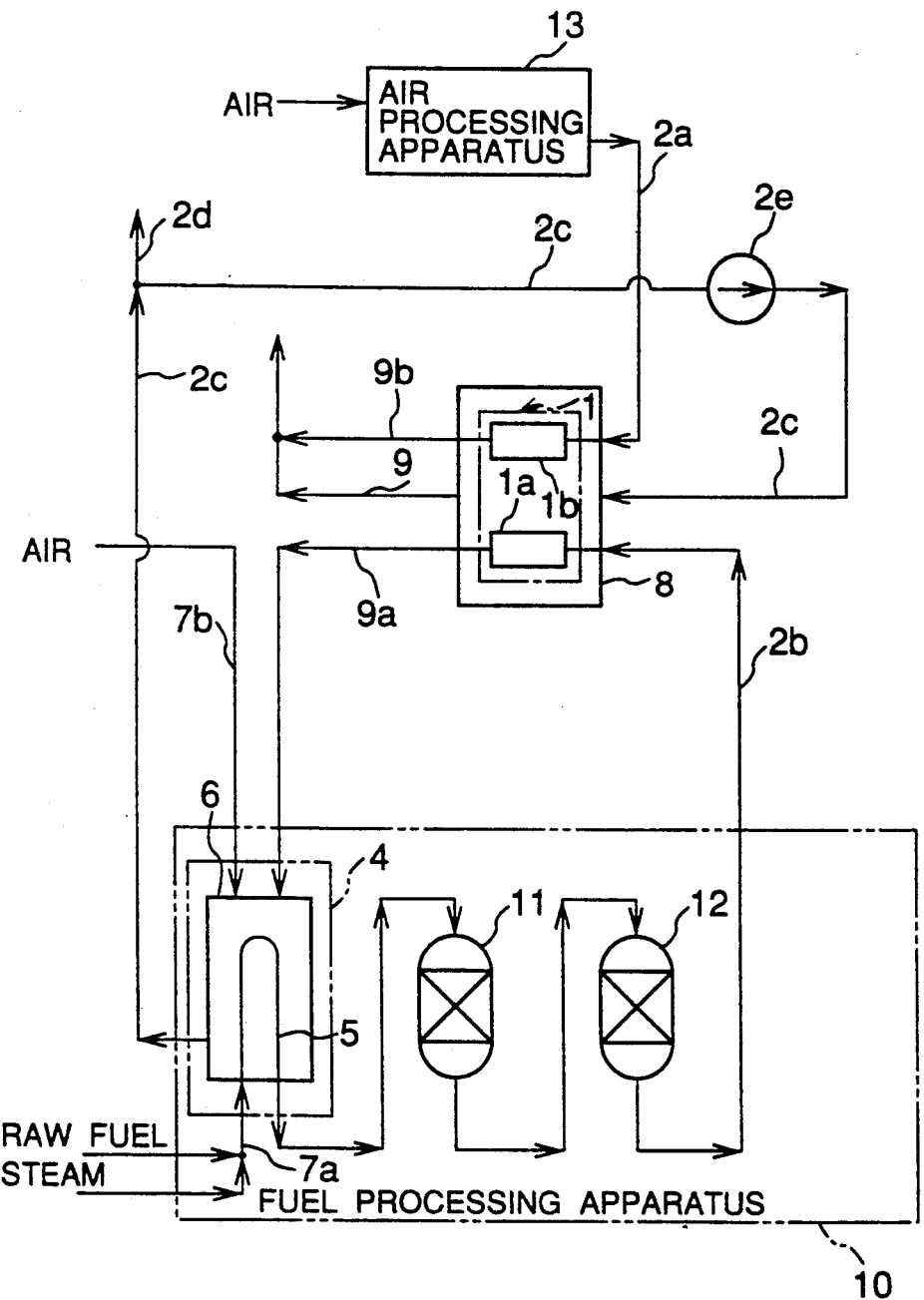
FIG. 4 is a system diagram showing a fourth example of a conventional fuel cell power plant.

More specifically, the exhaust gas from the reformer burner 56 generally has a water component with the high value of 10-20% since the main component of the waste fuel from the anode space 42 and which is supplied as fuel to the burner 56 of the reformer 54 is hydrogen. When such reformer burner exhaust gas is used as the purge gas for the containment vessel 41 of the fuel cell main unit 40, heat is discharged locally in the containment vessel 8 of or the purge gas pipe 2c as shown in FIG. 3, and there is a problem that the water component inside the gas easily condenses to cause drain.

For example, when the operating pressure inside the system in such a plant is 5 ata., the water component pressure of 20% of the purge gas is 1 ata, and is equivalent to a saturation pressure at 100° C. This is to say that drain is generated at places in the purge gas pipe 2c and in the containment vessel 41 where the local temperature is less than 100° C.

The generation of drain is harmful for the purge gas supply pipe 2c, the blower 2e and the containment vessel 8. More specifically, there is drain blockage for the purge gas supply pipe 2c so that there is the problem of safety of the fuel cell main unit should there be no flow of purge gas.

In addition, there is also the danger of blower destruction caused by drain attack on the impeller of the blower. Furthermore, the condensate water inside the containment vessel 8 degrades the insulation between the containment vessel 8 which is at ground potential and the cathode space 1b and the anode space 1a which are generally at a high potential, and operation of the power plant cannot be continued if an abnormal current flows. Accordingly, there is the danger that the reliability of the fuel cell power plant will deteriorate if there is drain generation inside the purge gas.

The following is a description of the sixth through ninth embodiments of the present invention.

Figure 11:
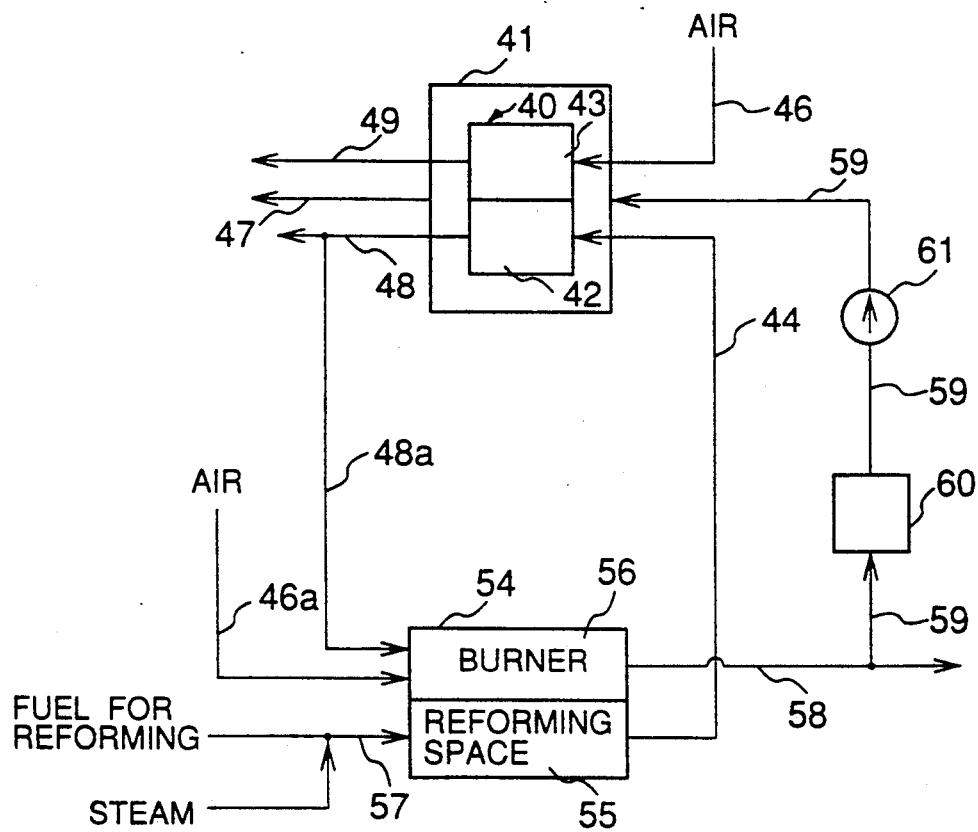
FIG. 11 is a system diagram showing a fuel cell power plant according to a sixth embodiment of the present invention.

The description will begin for a sixth embodiment, with reference to FIG. 11.

In FIG. 11, the fuel cell main unit 40 is provided with an anode space 42 and the cathode space 43, and the fuel cell main unit 40 is separated from the surrounding environment by the containment vessel 41 in which the fuel cell main unit 1 is contained. When there is power generation operation of the fuel cell, the fuel cell main unit 40 which generally has a layered structure, is at a high potential with respect to earth, while the containment vessel 41 is connected to the ground for safety reasons and is at ground potential. There is therefore a potential difference between the anode space 42 and the cathode space 43.

The reformer 54 is configured from a reforming space 55 and a burner 56, and a reforming fuel such as methanol or natural gas or the like is supplied along with steam to the reforming space 55 via a pipe 57, and generates a hydrogen-rich gas by steam reforming reaction. This reformed hydrogen-rich gas is then supplied to the anode space 42 via a pipe 44. Inside the fuel cell main unit 40, this reformed gas and the air which is supplied to the cathode space 43 as the oxidation agent via the pipe 46, react and the remaining components which are not consumed are discharged via the pipes 48 and 49 as waste fuel and waste air. The burner 56 of the reformer 54 has the function of supplying heat generated by combustion to the reforming space 55 as reforming heat for the steam reforming reaction, but in order to increase the efficiency of the fuel cell power plant, the waste fuel of the anode space 42 is supplied as a fuel for the burner 56 via the pipe 48a. The combustion air of the burner 56 is supplied by the pipe 46a. The exhaust gas which is combusted in the burner 56 is discharged to outside of the system via a pipe 58 but one portion of this is supplied via the blower along the purge gas pipe 59, to the containment vessel 41 of the fuel cell main unit 40, and the purge gas which passes the containment vessel 41 is discharged along the pipe 47.

The operation for up till here is the same as that for the conventional fuel cell power plant shown in FIG. 3.

The feature of this embodiment is that the purge gas inlet pipe 59 is provided with a dehumidifier 60.

A specific configuration of the dehumidifier 60 can be such that a water separation film, a water absorbing agent or a chemical water absorbing agent or the like can be used.

The following is a description of the operation of the sixth embodiment.

One portion of the exhaust gas from the reformer burner 56 and which is supplied as the purge gas to the containment vessel 41 is made to pass through the dehumidifier 60. The water component ratio of the exhaust as which passes through the dehumidifier 60 is lowered and so it is possible to prevent the generation of a large quantity of drain.

By the suitable selection of the dehumidification level of the dehumidifier 60, it is possible to lower the water saturation temperature of the purge gas to the room temperature or less. In this case, the generation of drain can be avoided even if there is a considerable drop in the temperature due to a large heat loss at one portion or all of the purge gas inlet pipe 59, blower 61 or containment vessel 41. As a result, it is possible to prevent the generation of drain.

According to this embodiment, the dehumidifier 60 is provided to the purge gas inlet pipe 59 and so it is possible to eliminate the danger of drain attack on the blower 61, and of drain blockage in the purge gas inlet pipe 59. Furthermore, the danger of a break down of electrical insulation occurring due to condensation inside the containment vessel 41 is eliminated.

As a result, it is possible to provide a fuel cell power plant which enables the realization of a high reliability.

Figure 12:
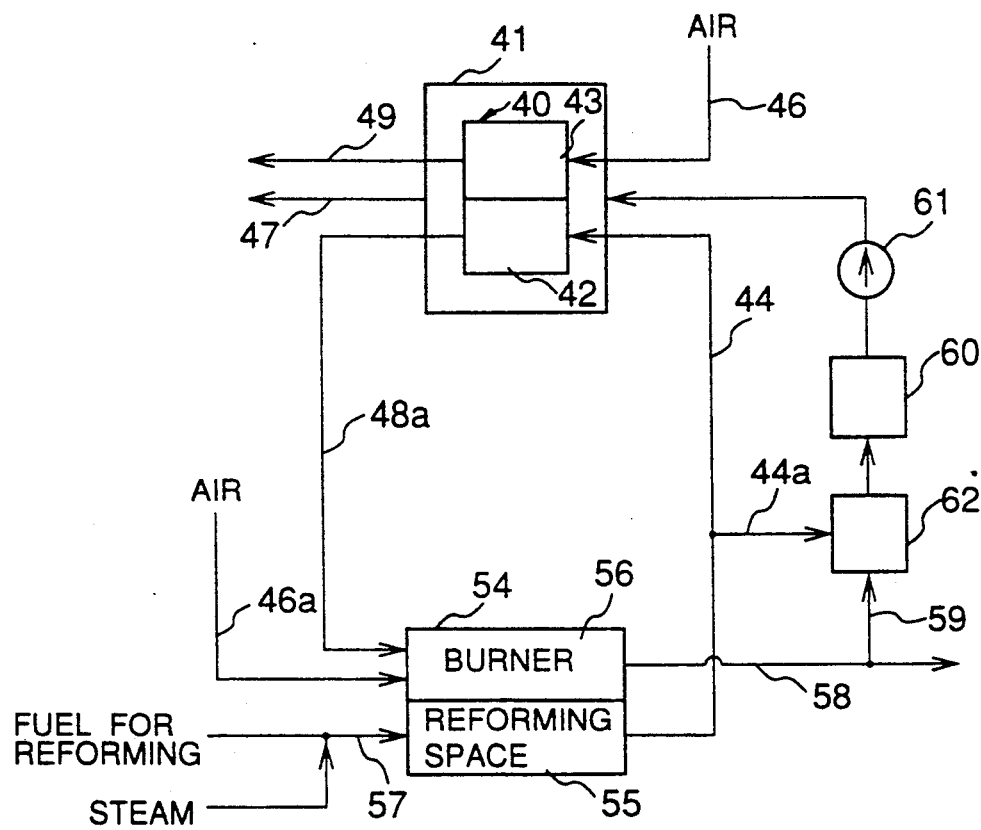
FIG. 12 is a system diagram showing a fuel cell power plant according to a seventh embodiment of the present invention.

The following is a description of a seventh embodiment of the present invention, with reference to FIG. 12.

In FIG. 12, the catalytic burner 62 is provided to the purge pipe, and the dehumidifier 60 is provided to the downstream side of the catalytic burner 62.

One portion of the reformer exhaust gas which is discharged from the burner 56 of the reformer 54 is supplied to the catalytic burner 62 via the pipe 59. In addition, the fuel for combustion in the catalytic burner 62 is one portion of the reformed gas which is discharged from the reforming space 55 of the reformer 54 and which is supplied to the catalytic burner 62 via the pipe 44a. The oxygen component which remains inside the exhaust gas which is discharged from the reformer burner 56 reacts inside the catalytic burner 62, with the reformed gas which is discharged from the reforming space 55, and produces carbon dioxide and water. The fuel for combustion in the catalytic burner 62 can use one portion of the waste fuel from the anode space 42 of the fuel cell main unit 40.

The exhaust gas which is discharged from the catalytic burner 62 is supplied as a purge gas to the containment vessel 41 of the fuel cell main unit 40 and via the dehumidifier 60 and the blower 61.

The following is a description of the operation of the seventh embodiment.

In general, one portion of the exhaust gas which is discharged from the burner 56 of the reformer 54 in a fuel cell power plant, is used as the purge gas for the containment vessel 41 and so it is desirable that this exhaust gas have as low a concentration of oxygen as possible.

On the other hand, the amount of combustion in the reformer burner 56 changes greatly and transitionally in accordance with the load level of the plant. Because of this, the continuous performance of safe combustion in the reformer burner 56 sometimes entails the supply of excess quantities of air for combustion via the pipe 46a.

In these cases, the concentration of the remaining oxygen in the exhaust gas which is discharged from the reformer burner 56 must be suitably small since this exhaust gas will be used as the purge gas.

In the embodiment shown in FIG. 12, a catalytic burner 62 is provided to the purge gas inlet pipe 59 and the residual oxygen component in the exhaust gas which is discharged from the reformer burner 56 is consumed in the catalytic burner 62. As a result, it is possible for the exhaust gas which is discharged from the catalytic burner 62 to be supplied to the containment vessel 41 as a purge gas which either contains no oxygen component concentration, or which has a very low concentration.

Moreover, in this embodiment, some water is produced in the combustive reactor in the catalytic burner 62. Because of this, the water component ratio in the exhaust gas which is discharged from the catalytic burner 62 is higher than the water component ratio of the exhaust gas from the reformer burner 56 and there is an increased danger that there will be the generation of drain. However, in this embodiment, the dehumidifier 60 is provided downstream of the catalytic burner 62 and so it is possible to reduce the water component ratio in the purge gas after the purge gas has passed through the dehumidifier 60. By this, it is possible to prevent the generation of drain in the purge gas.

According to the configuration of this seventh embodiment, a catalytic burner 62 is provided to the purge gas inlet pipe 59 ad a dehumidifier 60 is provided to the downstream side of the catalytic burner 62 and so even if there is the excess supply of air for combustion via the pipe 46a and so that stable combustion can be performed in the burner 56 of the reformer 54, it is possible for the exhaust gas which is discharged from the catalytic burner 62 to be supplied to the containment vessel 41 as a purge gas which either does not include an oxygen component or which has a sufficiently low concentration.

Moreover, in this case, a catalytic burner 62 is provided to the purge gas inlet pipe 59 and the dehumidifier 60 is provided on the downstream side of the catalytic burner 62 and so there is no adverse influence due to drain inside the containment vessel 41, the blower 61 or the piping. As a result, it is possible to provide a fuel cell power plant which realizes a high reliability.

Figure 13:
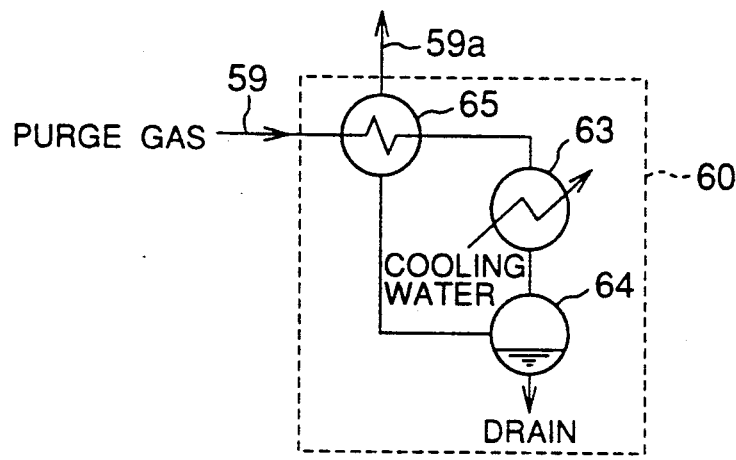
FIG. 13 is a system diagram showing a fuel cell power plant according to a eighth embodiment of the present invention.

The following is a description of an eighth embodiment of the present invention, with reference to FIG. 13.

In addition to the dehumidifier 60, FIG. 13 shows a specific configuration of a fuel cell power plant according to a eighth embodiment of the present invention. In FIG. 13, the purge gas is made to flow through a condenser 63, a water component separator 64 and a heat exchanger 65 in a configuration where the water component in the gas is removed. The purge gas is cooled by the condenser 63 and has the drain separated at the water component separator 64 and is then reheated at the heat exchanger 65 and is sent as an superheated gas. There is thus no danger of drain occurring downstream.

By the use of a configuration such as this for the dehumidifier 60, it is possible to obtain the same effect as for the sixth and seventh embodiments.

The following is a description of a fuel cell power plant according to a ninth embodiment of the present invention.

Figure 14:
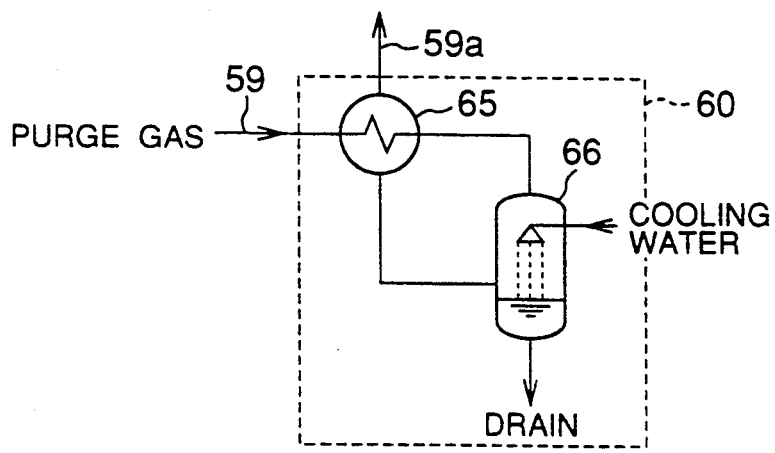
FIG. 14 is a system diagram showing a fuel cell power plant according to a ninth embodiment of the present invention.

FIG. 14 is a system diagram showing a fuel cell power plant according to a ninth embodiment of the present invention and including a dehumidifier 60. In this ninth embodiment, there is provided a contact cooler 66 instead of the condenser 63 and the water component separator 64 of FIG. 13. In this case, the purge gas has the drain separated by the contact cooler 66, is reheated by the heat exchanger 65 and sent as a superheated gas.

By the use of a configuration such as this for the dehumidifier 60, it is possible to obtain the same effect as for the sixth and seventh embodiments.

The following is a description of a fuel cell power plant according to tenth through fifteenth embodiment of the present invention, with reference to FIGS. 15-20. These fuel cell power plants according to tenth through fifteenth embodiments of the present invention are for the elimination of the conventional problems described below.

More specifically, in a conventional fuel cell power plant (Refer to FIG. 4) which uses the burner exhaust gas discharged from the burner 6 of the reformer 4 as the purge gas of the containment vessel, there are large changes in the amount of combustion heat of the reformer burner 6, depending of the operation conditions of the plant and so the oxygen concentration in the combustion exhaust gas is not constant, and in particular, will fluctuate largely due to changes in the load level. Because of this, there is also a large change in the oxygen concentration in the purge as inside the containment vessel 8 and when this change causes the oxygen concentration to exceed a certain level, there is the problem that it is no longer possible for the containment vessel 8 to be safely purged.

Figure 15:
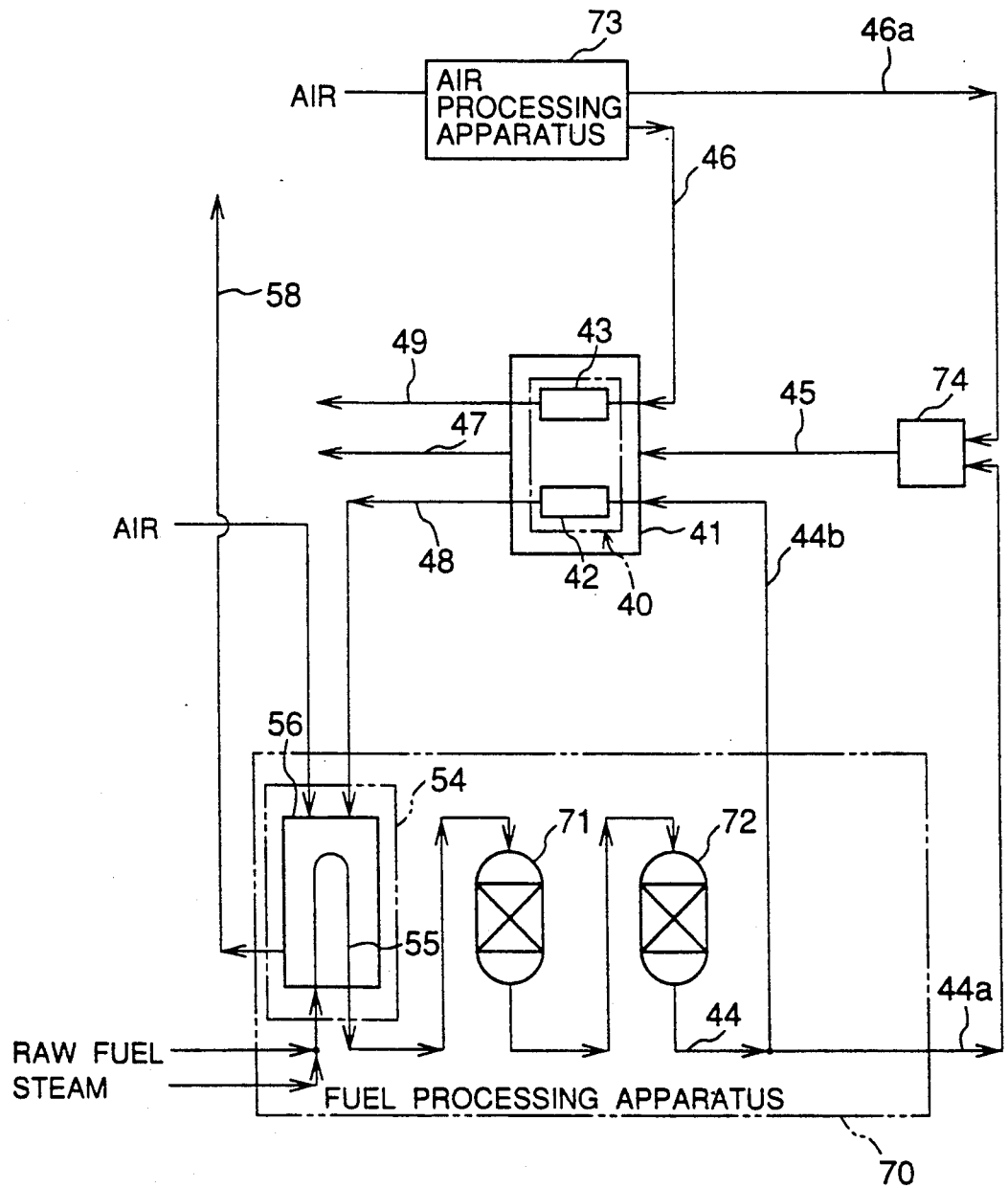
FIG. 15 is a system diagram showing a fuel cell power plant according to a tenth embodiment of the present invention.

The following is a description of the tenth through fifteenth embodiments of the present invention, starting with a description of a tenth embodiment, with reference to FIG. 15. In FIG. 15, the anode space 42 and the cathode space 43 for a layered structure of the fuel cell main unit 40 which is housed in the containment vessel 41. The anode space 42 is supplied with a hydrogen-rich gas from the fuel processing apparatus 70, and the cathode space 43 is supplied with the oxidation agent gas from the air processing apparatus. In this fuel cell main unit 40, power is produced by the electrochemical reaction between this hydrogen gas and the oxidation agent gas.

The hydrogen which is necessary at the anode space 42 is supplied from the fuel processing apparatus 70. The fuel processing apparatus 70 is configured from an reformer 54, a high-temperature carbon monoxide shift converter 71 and a low-temperature carbon monoxide shift converter 72. The reformer 54 comprises a reforming space 55 where the source fuel of natural gas or the like is heated to a temperature of 600°-800° C. and generates a hydrogen-rich gas by the steam reforming reaction, and a burner 56 which supplies the heat necessary for the reforming reaction.

The hydrogen-rich gas which is the reformed gas from the reformer 54 has its hydrogen concentration raised and the carbon monoxide concentration lowered by a shift reaction in the low-temperature carbon monoxide shift converter 72 and the high-temperature carbon monoxide shift converter 71 downstream. In the high-temperature carbon monoxide shift converter 71, there is a shift reaction at a temperature of 400° C. while in the low-temperature carbon monoxide shift converter 72 there is a shift reaction at a temperature of approximately 200° C. The hydrogen-rich gas which is discharged from the low-temperature carbon monoxide shift converter 72 is supplied to the anode space 42.

The waste fuel which contains the unreacted component from the anode space 42 is effectively used as fuel for combustion in the burner 56 of the reformer 54 to supply heat to the reforming space 55.

Air is normally used as the oxidation agent gas which is supplied to the cathode space 43 and so air from the atmosphere is supplied to the cathode space 43 via the air processing apparatus 73. An air compression apparatus such as a compressor or a blower or the like can be used for example, as the air processing apparatus 73.

The hydrogen rich gas discharged from the low-temperature carbon monoxide shift converter 72 is branched with one portion being supplied to the catalytic burner 74 via the pipe 44a. On the other hand, one portion of the air from the air processing apparatus 73 is supplied to the catalytic burner 74 and catalytic combustion occurs with the hydrogen rich gas supplied to the catalytic burner 74. Here, the flow settings for the air and the hydrogen rich gas are performed by a orifice means or the like in accordance with the necessity of the respective lines. The combustion exhaust gas discharged from the catalytic burner 74 is supplied to the containment vessel 41 as a purge gas via the pipe 45.

Moreover, in this tenth embodiment, the example used a catalytic burner 74 but instead of the catalytic burner 74, it is possible to have a configuration using a normal burner such as a burner or the like. This also applies to the embodiments described below.

The following is a description of the operation of a tenth embodiment of the present invention.

The gas composition of the hydrogen rich gas of the fuel processing apparatus 70 is generally constant irrespective of the load level and the operation status of the plant, and there is a constant oxygen concentration in the composition of the atmospheric air. Accordingly, the continuous combustion of a constant amount of hydrogen rich gas and a constant amount of air in a catalytic burner 74 enables a purge gas constantly having a substantially low or no concentration of oxygen to be obtained as a exhaust gas of the catalytic burner 74.

More specifically, the hydrogen gas concentration of the hydrogen-rich gas obtained from the fuel processing apparatus 70 is generally constant and the oxygen concentration in the air obtained from the air processing apparatus is also practically constant and so as a result of combusting the respectively constant amounts of hydrogen rich gas and air are in the catalytic burner 74, the exhaust gas which is discharged from the catalytic burner 74 has a gas composition for with a stable low or no oxygen concentration irrespective of the load level and the operation status of the plant. Accordingly, the supply of the exhaust gas discharged from the catalytic burner 74, as the purge gas to the containment vessel 41 enables the containment vessel 41 to be stably purged.

According to the configuration of this embodiment, there are provided a catalytic burner 74 and the hydrogen rich gas obtained from the fuel processing apparatus 70 is combusted in the catalytic burner 74 along with the air from the air processing apparatus 73 so that the combustion exhaust gas discharged from the catalytic burner 74 is supplied as the purge gas to the containment vessel 41 and so it is possible for safe and definite purging to be performed for all plant operation statuses by a purge gas which has a gas composition having a stably low or no oxygen concentration irrespective of the load level and the operation status of the plant.

Figure 16:
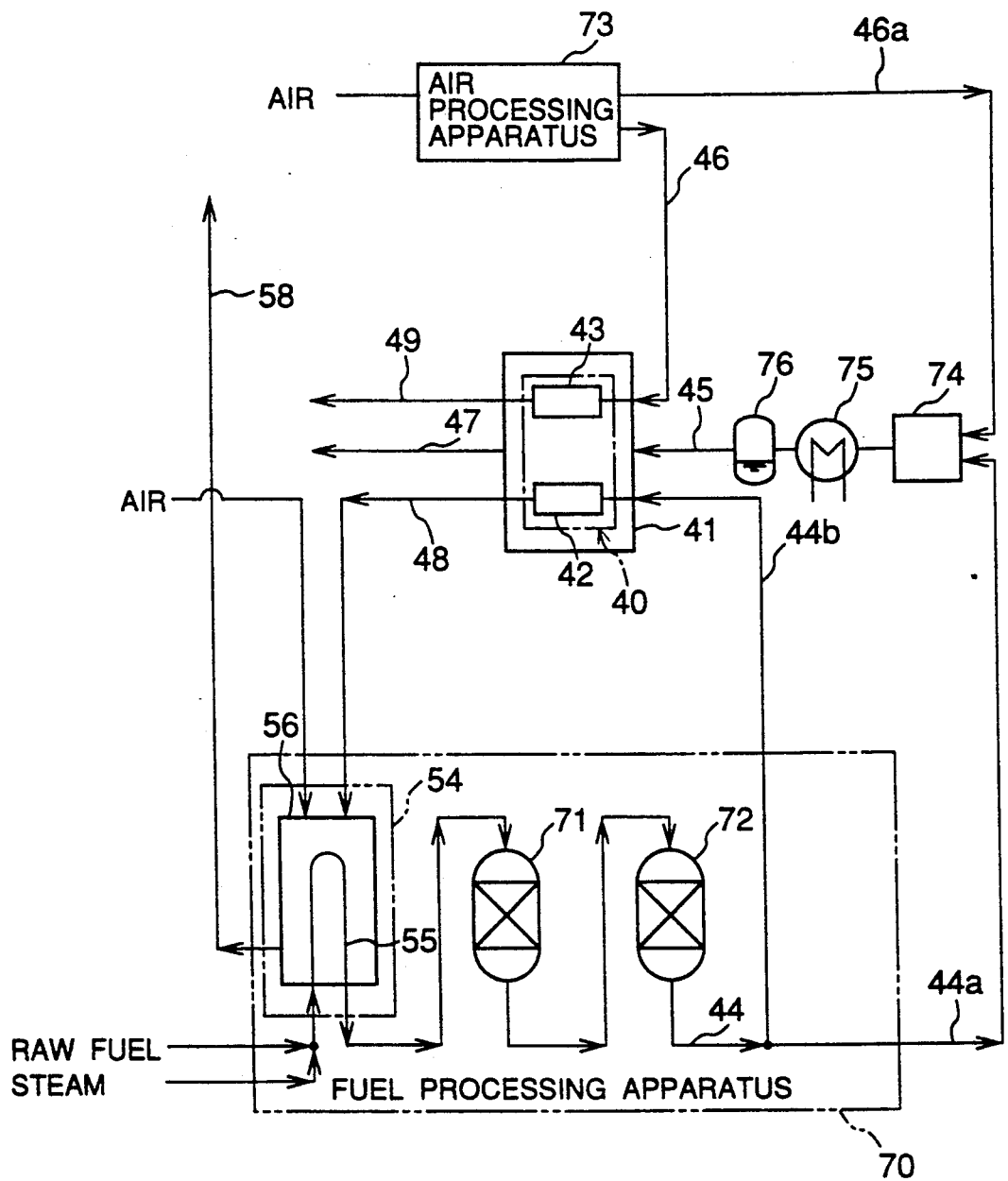
FIG. 16 is a system diagram showing a fuel cell power plant according to a eleventh embodiment of the present invention.

The following is a description of an eleventh embodiment of the present invention, with reference to FIG. 16.

In FIG. 16, a cooler 75 and a steam separator 76 are provided between the catalytic burner 74 and the containment vessel 41. Moreover, FIG. 16 shows the case where both the cooler 75 and the steam separator 76 are provided but when only the cooler 75 is provided, a condenser combining the cooler 75 can be steam separator 76.

According to the configuration of this eleventh embodiment, there is the same effect as the tenth embodiment. In addition, the cooler 75 or the steam separator 76 are provided and so it is possible to control the temperature of the combustion exhaust gas from the catalytic burner 74 so that it is less than the allowable high limit level for the temperature of the fuel cell. In addition, this combustion exhaust gas is dried by the cooler 75 and the steam separator 76 prevents the problem of drain in the purge line from occurring.

Figure 17:
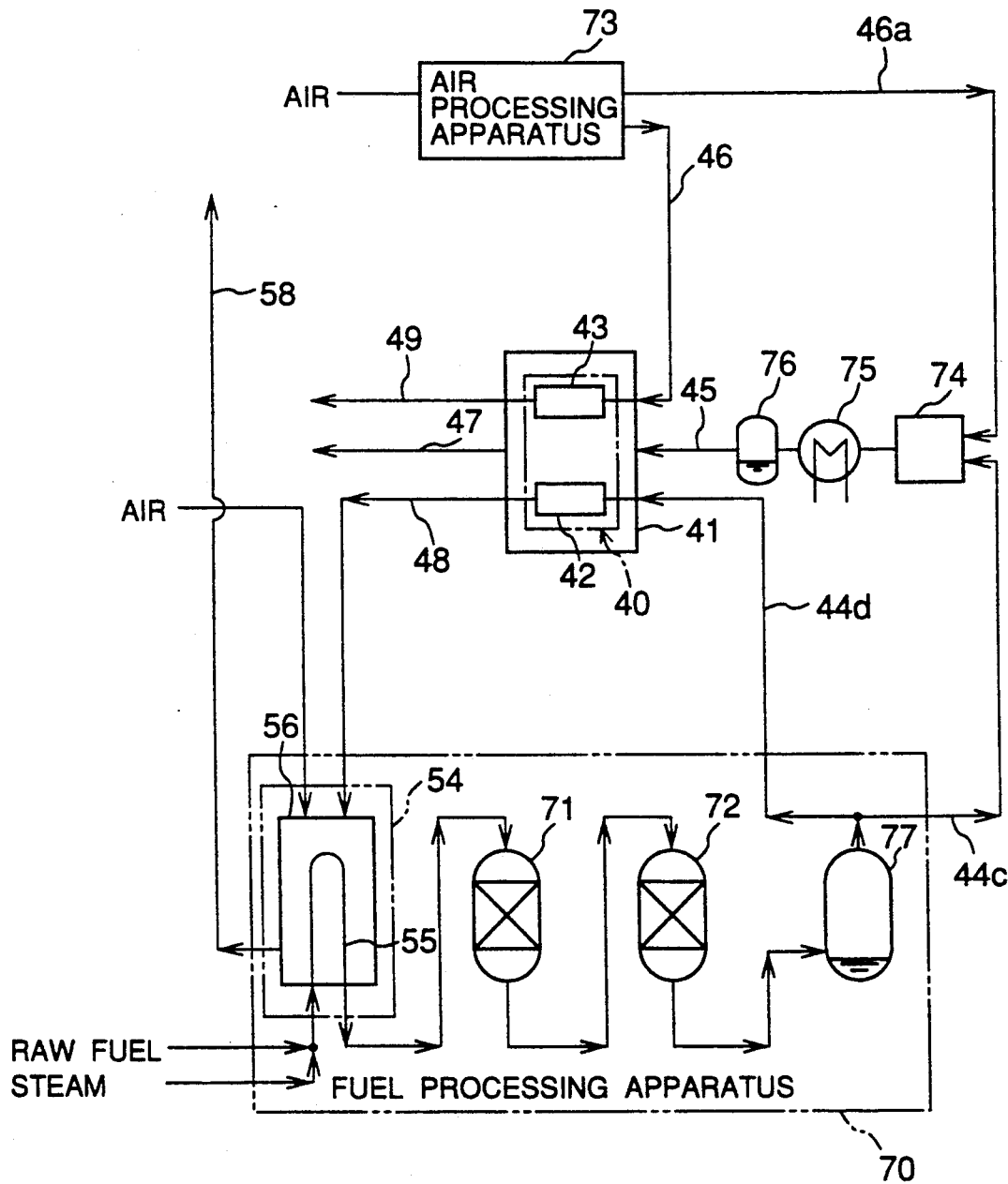
FIG. 17 is a system diagram showing a fuel cell power plant according to a twelfth embodiment of the present invention.

The following is a description of a twelfth embodiment of the present invention, with reference to FIG. 17.

As shown in FIG. 17, in addition to the catalytic burner 74, cooler 75 and the steam separator 76, the twelfth embodiment is provided with a condenser 77 downstream of the low-temperature carbon monoxide shift converter 72.

The hydrogen rich gas which is discharged from the condenser 77 is sent to the anode space 42 and the catalytic burner 74 by the pipe 12e.

According to the configuration of this twelfth embodiment, the hydrogen rich gas from the downstream side of the condenser 77 is branched and so the water component in the hydrogen rich gas is reduced. As a result, it is possible to make smaller the cooler 75 and the steam separator 76. In addition, the effect is the same as that of the tenth embodiment.

Moreover, the place where the hydrogen rich gas is taken from the fuel processing apparatus 70 is not limited to the downstream side of the low-temperature carbon monoxide shift converter 72 as was the case for the tenth and eleventh embodiments, but can be from the downstream side of the condenser 77 as in the case of the twelfth embodiment shown in FIG. 17, and furthermore, can be taken from the downstream side of the high-temperature carbon monoxide shift converter 71 or the downstream side of the reforming space 55 of the reformer 54.

The following is a description of a fuel cell power plant according to a thirteenth embodiment of the present invention.

Figure 18:
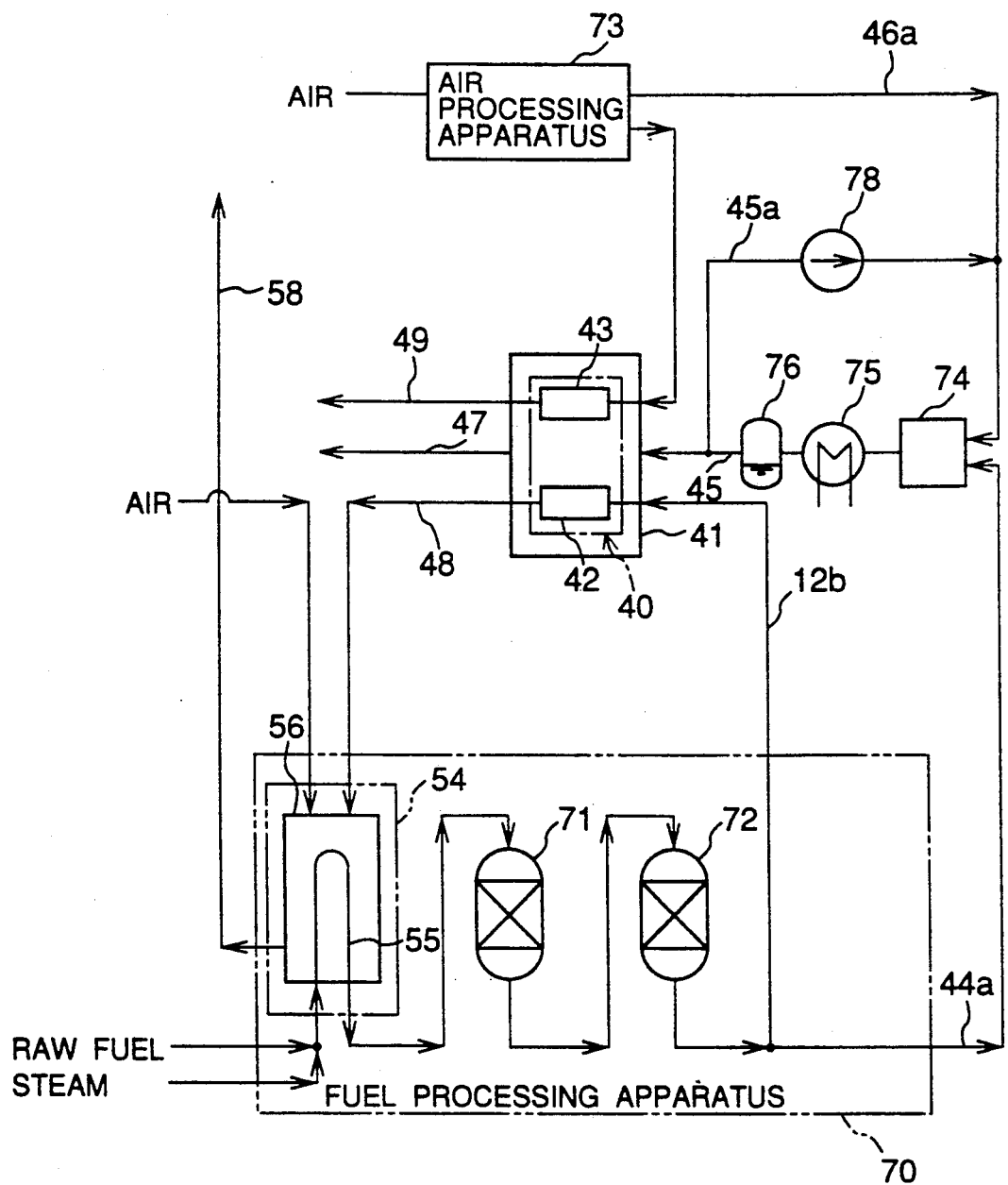
FIG. 18 is a system diagram showing a fuel cell power plant according to a thirteenth embodiment of the present invention.

As shown in FIG. 18, the configuration of this thirteenth embodiment is similar to that of the eleventh embodiment shown in FIG. 16. However, the thirteenth embodiment is also provided with a means which branches one portion of the purge gas by a pipe 45a from between the downstream side of the steam separator 76 and to the containment vessel 41, which passes this branched purge gas to return it to the upstream side of the catalytic burner 74 via a blower 78 and to recirculate it.

According to the configuration of this thirteenth embodiment, it is possible to lower the combustion temperature of the catalytic burner 74 by the recirculation of the purge gas and so it is possible to lower the material cost of the catalytic burner 74. The effects of the tenth embodiment can also be obtained.

Figure 19:
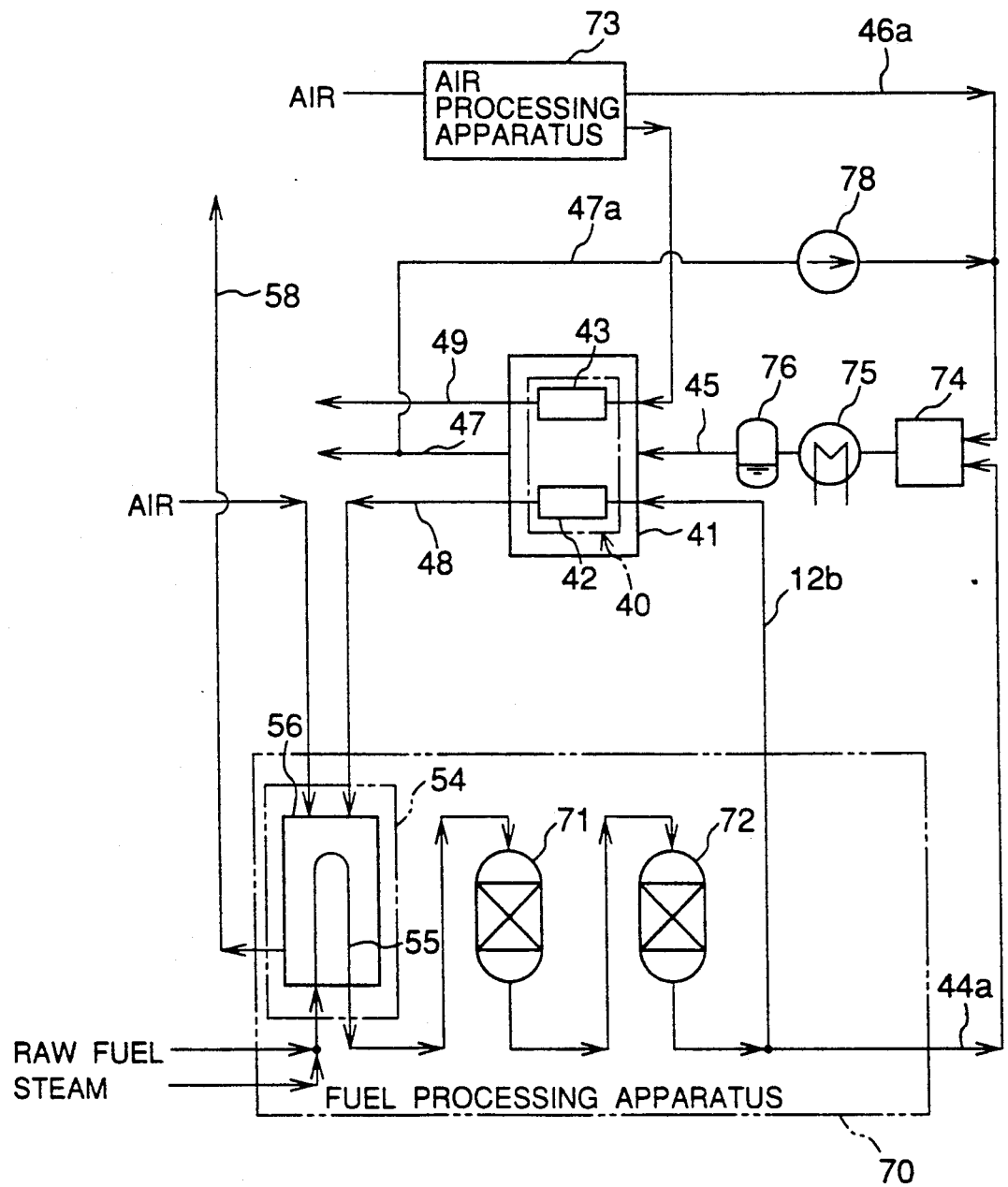
FIG. 19 is a system diagram showing a fuel cell power plant according to a fourteenth embodiment of the present invention.

In FIG. 19, there is provided a means by which the purge gas which is discharged from the outlet of the containment vessel 41 is branched by the pipe 47a and one portion of it is returned to the upstream side of the catalytic burner 74 via the blower 78 and recirculated.

According to this fourteenth embodiment, it is possible to lower the combustion temperature in the catalytic burner 74 by the recirculation of the purge gas. In addition, when compared with the thirteenth embodiment shown in FIG. 18, it is possible to increase the amount of purge gas which is supplied to the containment vessel 41. The other effects of the tenth embodiment can also be obtained.

Figure 20:
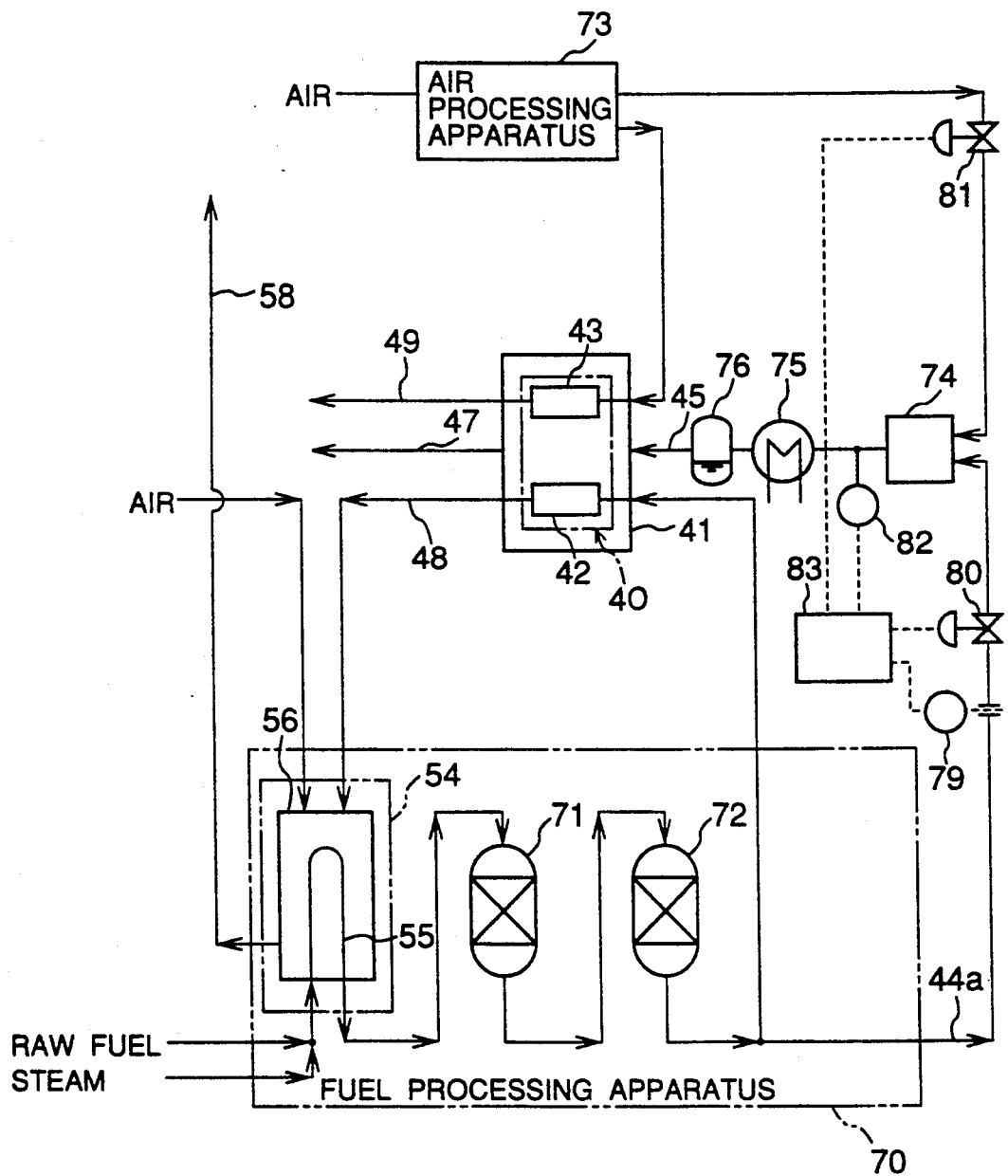
FIG. 20 is a system diagram showing a fuel cell power plant according to a fifteenth embodiment of the present invention.

The following is a description of a fuel cell power plant according to a fifteenth embodiment of the present invention, with reference to FIG. 20. In FIG. 20, the line which branches which the hydrogen rich gas from the downstream side of the low-temperature carbon monoxide shift converter 72 is provided with a flow detection apparatus 79 and a control valve 80. Also, the line which supplies air from the air processing apparatus 73 to the catalytic burner 74 is provided with a control valve 81 while the line of the combustion exhaust gas which is discharged from the catalytic burner 74 is provided with a gas concentration meter 82. The flow detection signals measured by the flow detection apparatus 79 are sent to the control apparatus 83, and the control valve 80 is opened or closed so that those detection signals are in agreement with a flow set value which has been set beforehand. In addition, the detection signals of the gas concentration meter 82 are also sent to the control apparatus 83 and the control valve 81 is opened or closed by those detection values.

According to the configuration of this embodiment, the flow amount of the purge gas to the containment vessel 41 can be controlled to the set value and it is possible to purge the containment vessel 41 using a suitable flow amount. In addition, there are also the effects of the tenth embodiment.

The following is a description of sixteenth through nineteenth embodiments of the present invention, with reference to FIG. 21 through FIG. 24. These sixteenth through nineteenth embodiments of the present invention, eliminate the following problems associated with the conventional art.

Figure 5:
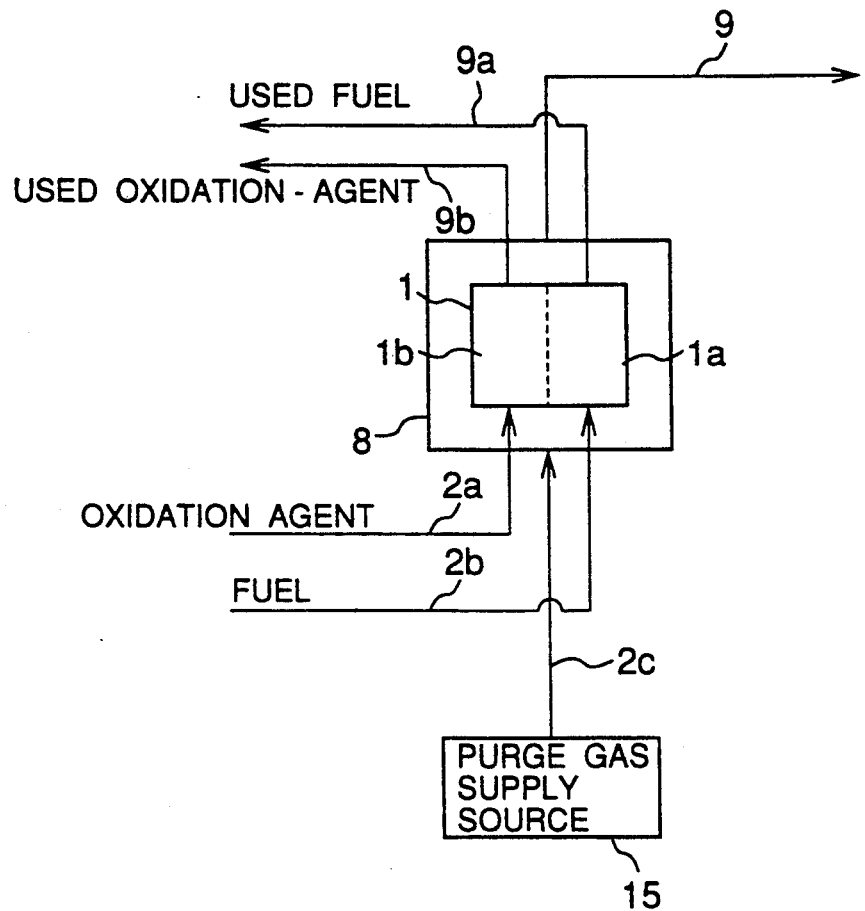
FIG. 5 is a system diagram showing a fifth example of a conventional fuel cell power plant.

More specifically, in the conventional case shown in FIG. 5 for when purge is performed using an inert gas to the purge gas supply source 15, there in an increase in the amount of inert gas necessary for long-term operation. This consumption of the inert gas creates the problem of a higher operating cost.

Figure 21:
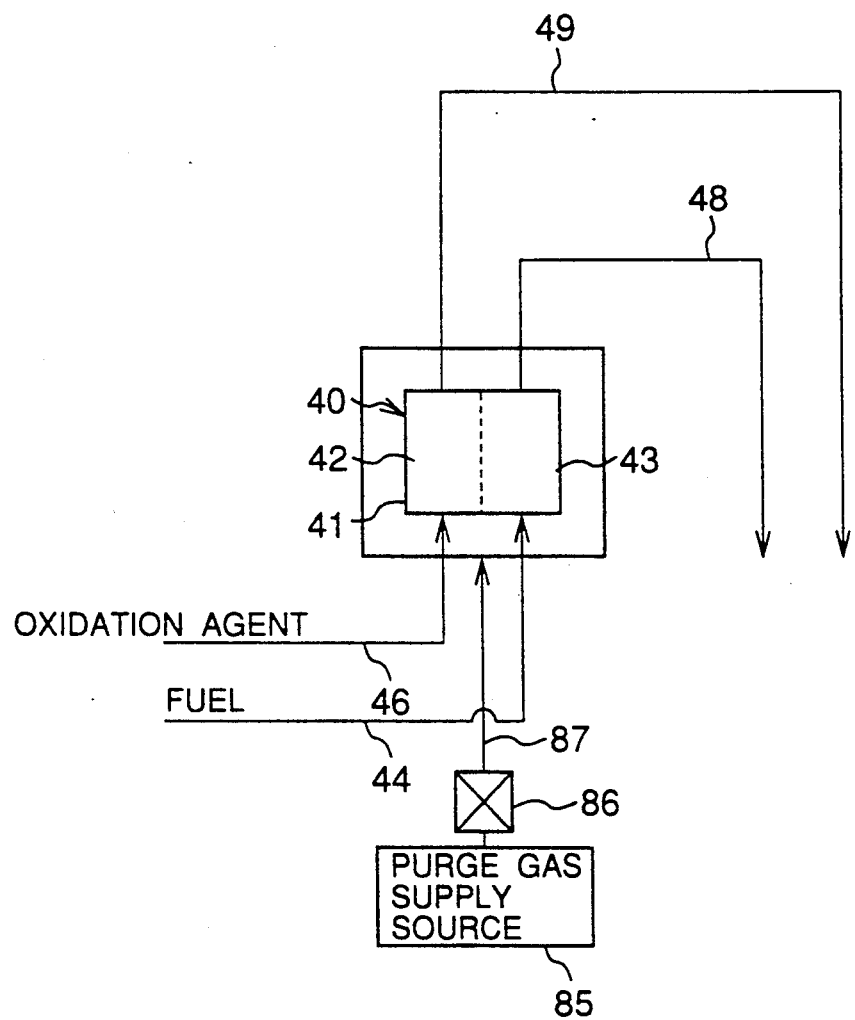
FIG. 21 is a system diagram showing a fuel cell power plant according to a sixteenth embodiment of the present invention.

The following is a description of the sixteenth through nineteenth embodiments of the present invention, starting with a description of the sixteenth embodiment with reference to FIG. 21. In FIG. 21, the fuel cell main unit 40 is housed airtightly inside the containment vessel 41. In addition, the fuel and the oxidation agent which react inside the fuel cell main unit 40 are exhausted as waste fuel and waste oxidation agent via the pipes 48 and 49. In addition, a purge gas supply source is provided and a purge gas is supplied to the containment vessel 41 from the purge gas supply source 85 via a purge inlet pipe 87. The purge gas which is supplied from the purge gas supply source 85 is air which has had its pressure raised by a compressor or a blower or the like.

The purge gas inlet pipe 87 is provided with an oxygen removal apparatus 86 to either remove the oxygen or to lower the concentration of it. This oxygen removal apparatus 86 uses an absorption agent such as a molecular sieve or a pressure swing absorption method (PSA method) for example, to absorb the oxygen.

The following is a description of the operation of the sixteenth embodiment.

The air from the purge gas supply source 85 is sent to the oxygen removal apparatus 86 where the oxygen in the air is removed so that there is either no or a reduced oxygen component.

According to the configuration of the sixteenth embodiment, there is provided an oxygen removal apparatus 86 and so it is possible to generate a purge gas which has either no or a reduced oxygen component. As a result, it is not necessary to use an inert gas as a purge gas for the containment vessel 41, and it is possible to provide a fuel cell power generation plant which has smaller running cost.

Moreover, the oxygen removal apparatus 86 can use an oxygen absorption agent, a chemical reaction agent, a separation membrane, a catalytic combuster, or any combination of such oxygen removal means.

Figure 22:
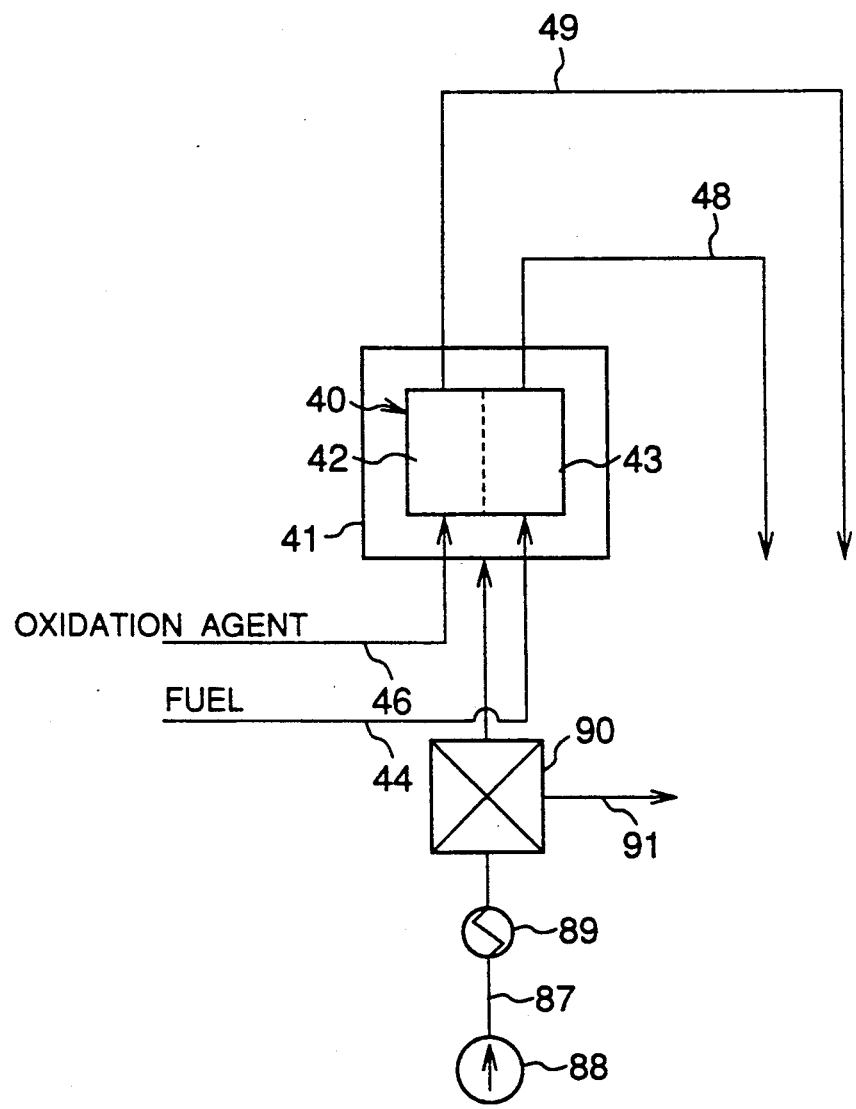
FIG. 22 is a system diagram showing a fuel cell power plant according to a seventeenth embodiment of the present invention.

The following is a description of a seventeenth embodiment of the present invention, with reference to FIG. 22.

As shown in FIG. 22 for this seventeenth embodiment, a compressor 88 which is the purge gas supply source is provided with an oxygen removal apparatus 90 which uses an oxygen removal agent such as a molecular sieve as described above, as the oxygen removal apparatus. In addition, it is desirable that the temperature of the air is lower than 50° C.-60° C. so that the oxygen can be absorbed and so a cooler 89 is provided between the compressor 88 and the oxygen absorption apparatus 90. Furthermore, the oxygen absorption apparatus 90 is provided with an oxygen discharge pipe 91 to discharge the oxygen which has been absorbed.

After the air which has been discharged from the compressor 88 is cooled by the cooler 89, it is sent to the oxygen absorption apparatus 90. In the oxygen absorption apparatus 90, the oxygen in the air is absorbed, and removed so that air having either no or a reduced oxygen component is generated. This air is then sent to the containment vessel 41 via the purge inlet pipe 87. Also, the oxygen which has been absorbed is discharged to the oxygen discharge pipe 91.

According to this seventeenth embodiment, there is provided the oxygen absorption apparatus 90 and so it is possible to easily generate a purge gas which has either no or a reduced oxygen component from air. As a result it is not necessary to use an inert gas as a purge gas for the containment vessel 41 and it is possible to provide a fuel cell power plant which has smaller running cost.

The following is a description of a fuel cell power plant according to a eighteenth embodiment of the present invention.

Figure 23:
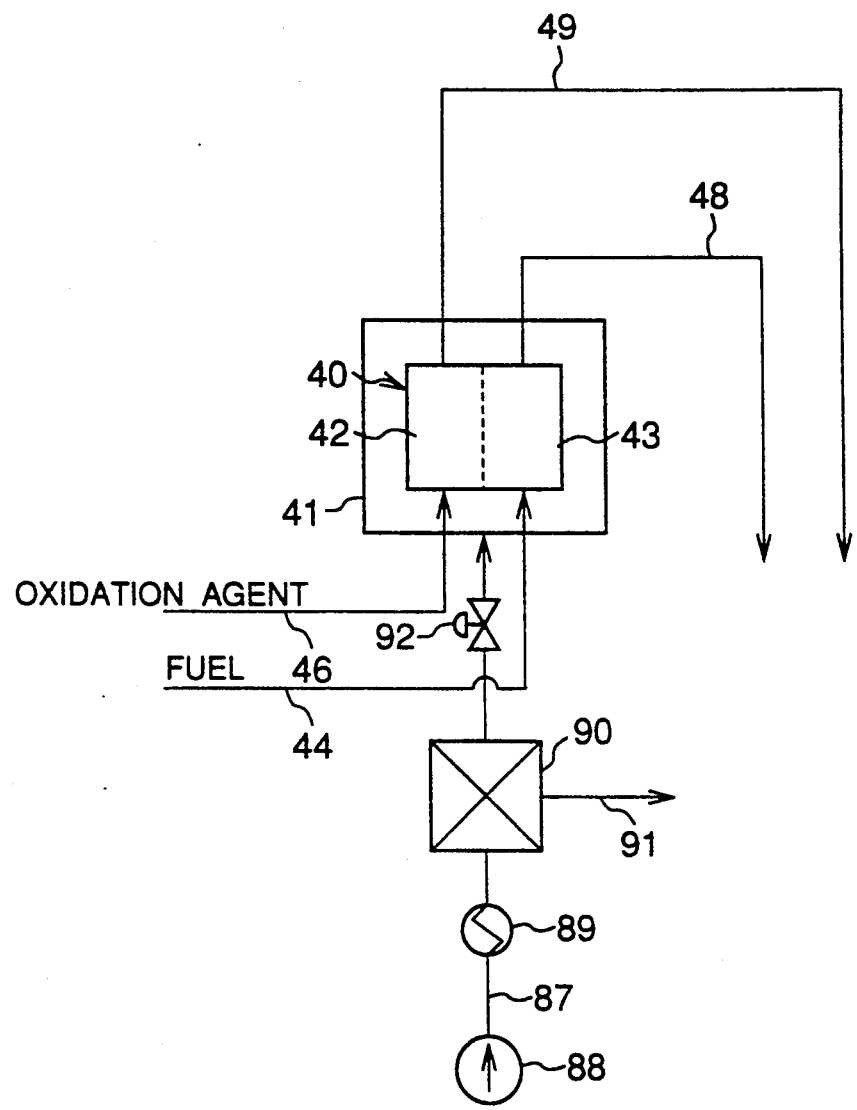
FIG. 23 is a system diagram showing a fuel cell power plant according to a eighteenth embodiment of the present invention.

As shown in FIG. 23, the purge inlet pipe 87 is provided with a purge flow adjustment valve 92.

Moreover, in FIG. 23, the purge flow adjustment valve 92 is provided downstream of the oxygen absorption apparatus 90 but can also be provided upstream. In addition, the purge flow adjustment valve 92 can have a modulating valve which enables adjustment of the degree of opening, or it can have an on-off shutoff valve only.

According to this eighteenth embodiment, the purge flow adjustment valve 92 is provided to the purge gas pipe 87 and so it is possible to open and close the purge amount adjustment valve 92 either periodically or in accordance with the flammable gas concentration inside the containment vessel 41, or in accordance with the pressure of the containment vessel 41, or in accordance with the pressure difference between the containment vessel 41 and the fuel cell main unit 40 and so have intermittent purging of the containment vessel 41.

Figure 24:
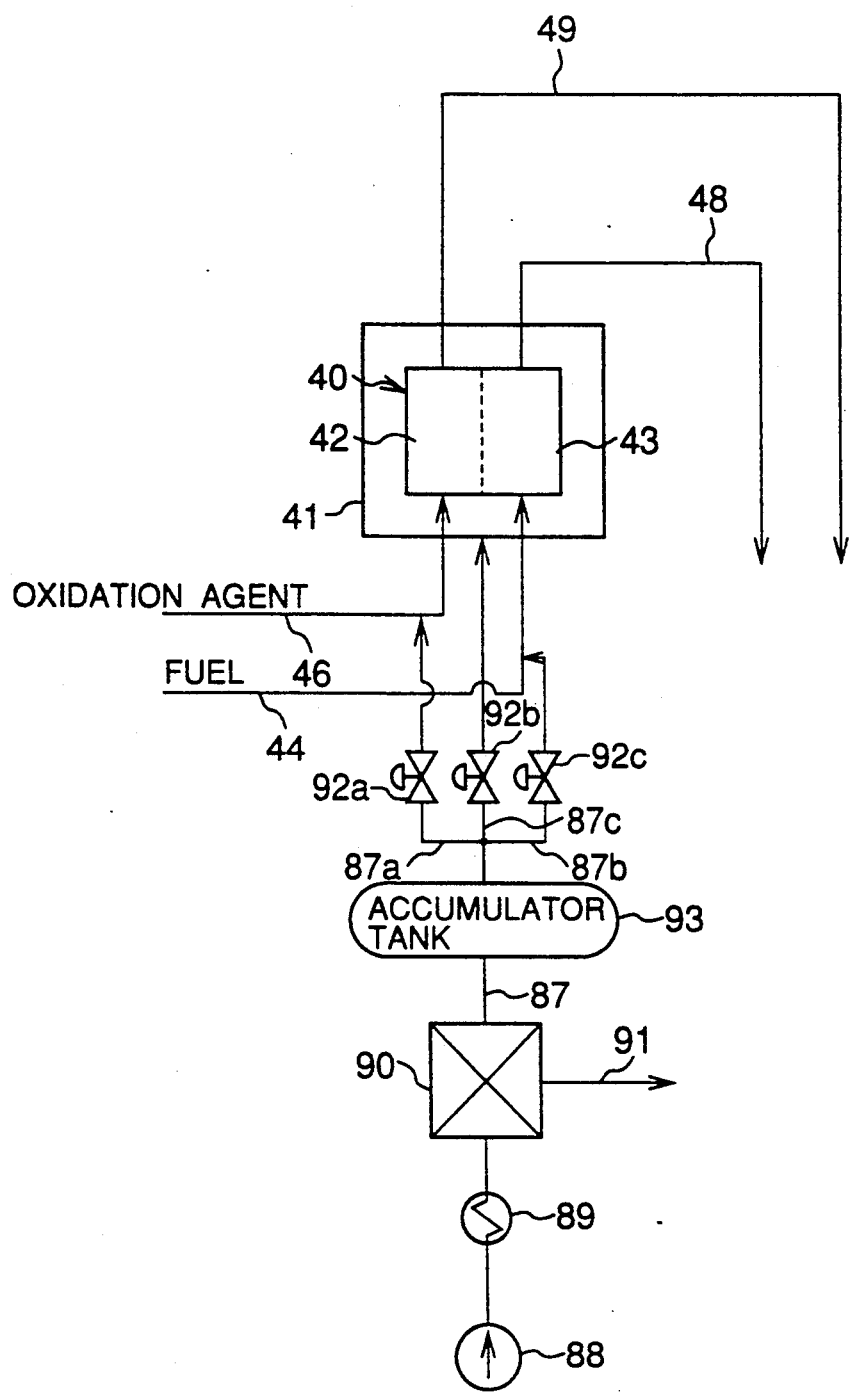
FIG. 24 is a system diagram showing a fuel cell power plant according to a nineteenth embodiment of the present invention.

FIG. 24 is a system diagram showing a fuel cell power plant according to a nineteenth embodiment of the present invention.

In this nineteenth embodiment, as shown in FIG. 24, an accumulator tank 93 is provided downstream of the oxygen absorption apparatus 90. Downstream of this accumulator tank 93 the purge inlet pipe 87 is divided into the three purge inlet pipes 87a, 87b and 87c. These three purge inlet pipes 87a, 87b and 87c supply a purge gas to the anode space and the cathode space (not shown in the figure) of the fuel cell main unit 40 as well as to the containment vessel 41. In addition, these three purge inlet pipes 87a, 87b and 87c are also provided with purge gas flow adjustment valves 92a, 92b and 92c. The air which has either no oxygen or which has a reduced concentration of oxygen and which is generated by the oxygen absorption apparatus 90 is stored in the accumulator tank 93.

Between the oxygen absorption apparatus 90 and the accumulator tank 93 can be provided a compressor to raise the pressure of the tank 93.

According to the configuration of this embodiment, it is possible to also purge the fuel cell main unit 40 as well as the containment vessel 41 by the opening and closing of the purge gas flow adjustment valves 92a, 92b and 92c in accordance with necessity. As a result, it is possible to provide a fuel cell power plant which has efficient and definite purging.

The present invention is not limited in the above embodiments, and may comprise the followings. That is, the fuel cell power plant comprises a fuel reformer including a reforming space in which said fuel is reformed a fuel gas before being supplied an anode space of said fuel cell main unit, and a burner which supplies heat for a reforming reaction in said reforming space; a gas separation apparatus for separating a carbon dioxide gas which is included in a burner exhaust gas which is generated by burning in the burner; and a purge gas supply pipe for connecting the gas separation apparatus and the containment vessel to supply as the purge gas the carbon dioxide gas which is separated by the gas separation apparatus, to the containment vessel.

What is claimed is:

1. A fuel cell power plant comprising:
   a fuel cell main unit to which a fuel is supplied;
   a containment vessel for housing said fuel cell main unit;
   a purge gas supply pipe for introducing a purge gas which excludes combustion elements in said containment vessel; and
   combustion element removal means, provided with said purge gas supply pipe, for effectively removing combustion elements in said purge gas before said purge gas is introduced in said containment vessel.

2. The fuel cell power plant of claim 1:
   wherein said combustion elements include oxygen, and said combustion element removal means comprises oxygen removal means which is provided along said purge gas supply pipe.

3. The fuel cell power plant of claim 2:
   wherein said oxygen removal means comprises oxygen adsorption means in which an adsorbent agent to remove said oxygen by an adsorption with said oxygen.

4. The fuel cell power plant of claim 2:
   wherein said oxygen removal means comprises combustor means for removing said oxygen which is included in said purge gas by means of a consumption of said oxygen by a combustion.

5. The fuel cell power plant of claim 4: further comprising a dehumidifier which is provided along said purge gas supply pipe and dehumidifies said purge gas to supply dehumidified purge gas to said containment vessel.

6. The fuel cell power plant of claim 4:
   wherein said combustor means comprises a catalytic combuster in which a catalyst is filled to hasten a reaction in said combustion for removing said oxygen included in said purge gas.

7. The fuel cell power plant according to claim 6: further comprising a dehumidifier which is provided along said purge gas supply pipe and dehumidifies said purge gas to supply dehumidified purge gas to said containment vessel.

8. The fuel cell power plant according to claim 1:

wherein said fuel cell power plant comprises
a fuel reformer including at least a reforming space in which said fuel is reformed as a reformed fuel gas before being supplied to an anode space of said fuel cell main unit ;
a fuel gas supply pipe for supplying said reformed fuel gas from said reforming space to said anode space of said fuel cell main unit;
a gas separation apparatus which is provided to said fuel gas supply pipe and separates a carbon dioxide gas included in said reformed fuel gas; and
a purge gas supply pipe for connecting said gas separation apparatus and said containment vessel in order to supply as said purge gas said carbon dioxide gas which is separated by said gas separation apparatus, into said containment vessel.

9. The fuel cell power plant according to claim 1:
wherein said fuel cell power plant comprises
a fuel reformer including at least a reforming space in which said fuel is reformed as a reformed fuel gas before being supplied to an anode space of said fuel cell main unit;
a used fuel gas exhaust pipe for exhausting from said fuel cell main unit a used fuel gas which is generated after said reformed fuel gas is supplied to anode space of said fuel cell main unit and is used for a power generation;
a gas separation apparatus which is provided to said used fuel gas exhaust pipe and separates a carbon dioxide gas included in said used fuel gas; and
a purge gas supply pipe for connecting said gas separation apparatus and said containment vessel in order to supply as said purge gas said carbon dioxide gas which is separated by said gas separation apparatus, into said containment vessel.

10. The fuel cell power plant according to claim 1:
wherein said fuel cell power plant further comprises
a fuel reformer including at least a reforming space in which said fuel is reformed before being supplied to an anode space of said fuel cell main unit, and a burner which supplies heat for a reforming reaction in said reforming space;
and wherein said purge gas supply pipe connects said burner and said containment vessel to use as said purge gas a burner exhaust gas which is exhausted from said burner.

11. The fuel cell power plant according to claim 10:
further comprising a dehumidifier which is provided along said purge gas supply pipe and dehumidifies said purge gas to supply dehumidified purge gas to said containment vessel.

12. The fuel cell power plant according to claim 10:
wherein said combustion elements include oxygen, and said combustion element removal means comprises oxygen removal means which is provided along said purge gas supply pipe.

13. The fuel cell power plant according to claim 12:
further comprising a dehumidifier which is provided along said purge gas supply pipe and dehumidifies said purge gas to supply dehumidified purge gas to said containment vessel.

14. The fuel cell power plant according to claim 12:
wherein said oxygen removal means comprises oxygen adsorption means in which an adsorbent agent to remove said oxygen by an adsorption with said oxygen.

15. The fuel cell power plant according to claim 14:
further comprising a dehumidifier which is provided along said purge gas supply pipe and dehumidifies said purge gas to supply dehumidified purge gas to said containment vessel.

16. The fuel cell power plant according to claim 14:
wherein said oxygen removal means comprises combustor means for removing said oxygen which is included in said purge gas by means of a consumption of said oxygen by a combustion.

17. The fuel cell power plant according to claim 16:
further comprising a dehumidifier which is provided along said purge gas supply pipe and dehumidifies said purge gas to supply dehumidified purge gas to said containment vessel.

18. The fuel cell power plant according to claim 16:
wherein said combustor means comprises a catalytic combuster in which a catalyst is filled to hasten a reaction in said combustion for removing said oxygen in said purge gas from said burner.

19. The fuel cell power plant according to claim 18:
further comprising a dehumidifier which is provided along said purge gas supply pipe and dehumidifies said purge gas to supply dehumidified purge gas to said containment vessel.

20. The fuel cell power plant according to claim 1:
wherein said fuel cell power plant comprises
a fuel reformer including at least a reforming space in which said fuel is reformed as a reformed fuel gas before being supplied to an anode electrode space of said fuel cell main unit, and a burner which supplies heat for a reforming reaction in said reforming space;
a gas separation apparatus for separating a carbon dioxide gas which is included in a burner exhaust gas which is generated by burning in said burner; and
a purge gas supply pipe for connecting said gas separation apparatus and said containment vessel to supply as said purge gas said carbon dioxide gas which is separated by said gas separation apparatus, to said containment vessel.

21. The fuel cell power plant according to claim 20:
further comprising a dehumidifier which is provided along said purge gas supply pipe and dehumidifies said purge gas to supply dehumidified purge gas to said containment vessel.

22. The fuel cell power plant according to claim 1:
wherein said fuel cell power plant further comprises
a fuel reformer including at least a reforming space in which said fuel is reformed as a reformed fuel gas before being supplied to an anode space of said fuel cell main unit, and a burner which supplies heat for a reforming reaction in said reforming space;
a fuel gas supply pipe for supplying said reformed fuel gas from said reforming space to an anode space of said fuel cell main unit; and
a catalytic combustor which combusts a burner exhaust gas exhausted from said burner and said reformed fuel gas supplied from said reforming space so as to supply as said purge gas a combustion gas to said purge gas supply pipe.

23. The fuel cell power plant according to claim 22:
further comprising a dehumidifier which is provided along said purge gas supply pipe and dehumidifies said purge gas to supply dehumidified purge gas to said containment vessel.

24. The fuel cell power plant according to claim 1:
wherein said fuel cell power plant further comprises a fuel reformer including at least a reforming space in which said fuel is reformed as a reformed fuel gas before being supplied to an anode space of said fuel cell main unit;

a fuel gas supply pipe for supplying said reformed fuel gas from said reforming space to said anode electrode space of said fuel cell main unit;

an oxygen agent gas supply source for supplying an oxygen agent gas to said fuel cell power plant; and a catalytic combustor which combusts said reformed fuel gas and said oxygen agent gas to generate said purge gas so as to supply said purge gas to said purge gas supply pipe.

25. The fuel cell power plant according to claim 24: further comprising a dehumidifier which is provided along said purge gas supply pipe and dehumidifies said purge gas to supply dehumidified purge gas to said containment vessel.

26. The fuel cell power plant according to claim 1:
wherein said fuel cell power plant further comprises an oxygen removal apparatus which removes oxygen in the air to supply said air removed oxygen to said containment vessel; and said air from which oxygen is removed, is supplied as said purge gas to said containment vessel through said purge gas supply pipe.

* * * * *